(12) United States Patent
Ikuta

(10) Patent No.: US 9,405,057 B2
(45) Date of Patent: Aug. 2, 2016

(54) DISPLAY DEVICE AND TELEVISION RECEIVER

(75) Inventor: Kaori Ikuta, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 282 days.

(21) Appl. No.: 14/239,981

(22) PCT Filed: Aug. 29, 2012

(86) PCT No.: PCT/JP2012/071835
§ 371 (c)(1),
(2), (4) Date: Feb. 20, 2014

(87) PCT Pub. No.: WO2013/031829
PCT Pub. Date: Mar. 7, 2013

(65) Prior Publication Data
US 2014/0226072 A1 Aug. 14, 2014

(30) Foreign Application Priority Data

Aug. 31, 2011 (JP) .................................. 2011-189305

(51) Int. Cl.
*F21V 8/00* (2006.01)
*G02F 1/1335* (2006.01)
*H04N 5/44* (2011.01)

(52) U.S. Cl.
CPC .............. *G02B 6/0081* (2013.01); *G02B 6/009* (2013.01); *G02B 6/0088* (2013.01); *G02F 1/133608* (2013.01); *G02F 1/133615* (2013.01); *H04N 5/44* (2013.01); *G02F 2001/133628* (2013.01)

(58) Field of Classification Search
CPC ............ G02F 1/133615; G02B 6/0073; G02B 6/0085–6/0091; G02B 6/0011; G02B 6/0066; G02B 6/0081
See application file for complete search history.

(56) References Cited

U.S. PATENT DOCUMENTS

| 7,441,938 B2 * | 10/2008 | Sakai | G02B 6/0068 362/612 |
| 2007/0211191 A1 * | 9/2007 | Cho | G02B 6/0073 349/58 |
| 2009/0086505 A1 * | 4/2009 | Iwasaki | G02B 6/0041 362/612 |

(Continued)

FOREIGN PATENT DOCUMENTS

JP 2010-170922 A 8/2010

*Primary Examiner* — Julie Bannan
(74) *Attorney, Agent, or Firm* — Chen Yoshimura LLP

(57) ABSTRACT

A liquid crystal display device (10) related to the present invention is provided with an LED (17); a heat-dissipating member (19) mounted with the LED (17); a liquid crystal panel (11) that uses light from the LED (17) to display; a light guide plate (16) that is disposed on a side of the liquid crystal panel (11) opposite to the display surface (11a), the light guide plate being disposed such that an end surface thereof faces the LED (17); a chassis (14) arranged on a side of the light guide plate (16) opposite to the liquid crystal panel (11); a frame (13) that is arranged on the display surface (11a) of the liquid crystal panel (11), the frame holding the liquid crystal panel (11) and the light guide plate (16) by sandwiching the liquid crystal panel (11) and the light guide plate (16) with the chassis (14) while housing the LED (17) and the heat-dissipating member (19) therein, the frame constituting the exterior of the liquid crystal display device (10); and a protruding member (21) that protrudes from the frame (13) to the heat dissipating member (19), the protruding member being provided to attach the heat dissipating member (19) to the frame (13), the protruding member having a heat insulating layer (HIR) interposed between the protruding member and the heat dissipating member (19).

16 Claims, 20 Drawing Sheets

(56) References Cited

U.S. PATENT DOCUMENTS

| | | | |
|---|---|---|---|
| 2011/0090422 A1* | 4/2011 | Hamada | G02B 6/0085 349/62 |
| 2011/0170315 A1* | 7/2011 | Chen | G02B 6/0011 362/612 |
| 2011/0242458 A1* | 10/2011 | Itakura | G02B 6/0068 349/65 |
| 2012/0188747 A1* | 7/2012 | Mine | G02B 6/0068 362/97.1 |
| 2014/0184929 A1* | 7/2014 | Nakamura | G02F 1/133308 348/836 |

* cited by examiner

DISPLAY DEVICE AND TELEVISION RECEIVER

TECHNICAL FIELD

The present invention relates to a display device and a television receiver.

BACKGROUND ART

In liquid crystal display devices such as a liquid crystal television, for example, a liquid crystal panel, which is a display panel thereof, does not emit light, and therefore, it is necessary to separately provide a backlight device as an illumination device. An example of the backlight device is described in Patent Document 1 below.

RELATED ART DOCUMENT

Patent Document

Patent Document 1: Japanese Patent Application Laid-Open Publication No. 2010-170922

Problems to be Solved by the Invention

The liquid crystal display device described above has a liquid crystal display unit in which a liquid crystal panel and a backlight device are held as an assembled component by a metal bezel that is placed over the liquid crystal panel from the front side thereof, and typically, the liquid crystal display unit is enclosed by a synthetic resin cabinet that is an exterior member, thereby being provided as a product.

However, in recent years, because of demands for a reduction in manufacturing cost or a further reduction in thickness, elimination of the synthetic resin cabinet is being considered. If the cabinet is eliminated, however, the members such as the bezel that were housed in the cabinet in the conventional configuration are exposed to the outside. These members receive heat from the light source, and are therefore likely to be hot. Thus, if the members that were housed in the cabinet are simply exposed to the outside, when an external object touches these members, the external object can be adversely affected by heat.

SUMMARY OF THE INVENTION

The present invention was completed in view of the above-mentioned situation, and an object thereof is to mitigate an increase in temperature of the exterior member.

Means for Solving the Problems

A display device of the present invention includes: a light source; a light source attachment member to which the light source is attached; a display panel that conducts display using light from the light source; a light guide plate disposed so as to lie on the display panel on a side of the display panel opposite to a display surface thereof, the light guide plate being disposed such that an end face thereof faces the light source; a chassis disposed on a side of the light guide plate opposite to the display panel; an exterior member disposed on the display surface of the display panel, the exterior member holding the display panel and the light guide plate by sandwiching the display panel and the light guide plate with the chassis while housing the light source and the light source attachment member therein, the exterior member constituting a part of an exterior of the display device; and a protruding member that protrudes from the exterior member toward the light source attachment member, the protruding member being provided to attach the light source attachment member to the exterior member, wherein the protruding member and the light source attachment member are configured to provide for a heat insulator therebetween.

With this configuration, light emitted from the light source is guided into the display panel after entering the end face of the light guide plate that faces the light source, and by using the light, an image is displayed on the display panel. When the light source is lit, heat is generated by the light source, and the heat is first transferred to the light source attachment member to which the light source is attached, and thereafter, the light would possibly be transferred from the light source attachment member to the protruding member. Because the heat insulating layer is interposed between the light source attachment member and the protruding member, however, the heat transfer from the light source attachment member to the protruding member can be effectively mitigated. The protruding member protrudes from the exterior member that is disposed on the display surface side of the display panel, and therefore, by mitigating the heat transfer to the protruding member, it is possible to mitigate an increase in temperature of the exterior member caused by the heat from the light source. The exterior member is disposed on the display surface side of the display panel, and is exposed to the outside for constituting the exterior of the display device, and thus, an external object can easily touch the exterior member. However, by mitigating the temperature increase thereof as described above, it is possible to effectively prevent the heat from adversely affecting the external object when the object touches the exterior member.

As embodiments of the present invention, the following configurations are preferred.

(1) The light source attachment member has a heat dissipating section that extends along a plate surface of the chassis and that makes surface-to-surface contact with the plate surface of the chassis. With this configuration, heat is efficiently transferred from the heat dissipating section of the light source attachment member to the chassis, thereby making it difficult for the heat to be trapped inside of the display device. The chassis is disposed on the side of the light guide plate opposite to the display panel, and therefore, even though the chassis is exposed to the outside, an external object does not touch the chassis as easily as the exterior member that is disposed on the display surface side. Therefore, even if the temperature of the chassis increases due to the heat from the light source, the higher temperature is unlikely to be a problem.

(2) The heat dissipating section is disposed between the protruding member and the chassis, and the heat insulating layer is interposed between the heat dissipating section and the protruding member. With this configuration, heat transfer from the heat dissipating section to the protruding member is mitigated, and as a result, an increase in temperature of the exterior member can be further mitigated.

(3) The light source attachment member has a light source attachment section to which the light source is attached, the light source attachment section being disposed between the light guide plate and the protruding member, and the heat insulating layer is interposed between the light source attachment section and the protruding member. With this configuration, heat transfer from the light source attachment section to the protruding member is mitigated, and as a result, an increase in temperature of the exterior member can be further mitigated.

(4) The exterior member has a positioning portion that can position the light source attachment member with respect to the light guide plate by engaging an end of the light source attachment section. With this configuration, the light source attachment member can be positioned with respect to the light guide plate by the positioning portion, and therefore, it is possible to achieve a stable positional relationship between the light source attached to the light source attachment section and the end face of the light guide plate. With this configuration, the incident efficiency of light that enters the end face of the light guide plate from the light source can be made stable.

(5) The exterior member at least has a panel pressing portion that lies in parallel with the display surface of the display panel and that presses the display panel, and the protruding member is configured to protrude from the panel pressing portion toward the chassis. With this configuration, although the panel pressing portion is more likely to be touched by an external object than any other portions in the exterior member that is disposed on the display surface side of the display panel, heat transfer from the light source attachment member to the protruding member is blocked by the heat insulating layer. As a result, an increase in temperature of the panel pressing portion can be effectively mitigated, and therefore, this configuration is even more effective.

(6) The exterior member has a light-shielding portion interposed between the display panel and the light source. In this configuration, by the light-shielding portion, it is possible to prevent light from the light source from directly entering the display panel without passing through the light guide plate. This results in excellent display quality.

(7) The exterior member has a supporting portion that supports a surface of the light guide plate that faces the display panel. With this configuration, the light guide plate can be supported by the supporting portion from the side facing the display panel, and therefore, it is possible to achieve a stable positional relationship between the light source and the light guide plate. As a result, the incident efficiency of light that enters the light guide plate from the light source can be made stable.

(8) The display device is provided with a holding member that is attached to the protruding member and that holds the light source attachment member and the chassis altogether by sandwiching the light source attachment member and the chassis with the protruding member. With this configuration, by having the holding part, the light source attachment member and the chassis can be collectively affixed to the exterior member. Because the protruding member acts as an attachment structure for the light source attachment member and also an attachment structure for the chassis, this configuration is effective to achieve a simpler structure.

(9) The display device is provided with a gap restricting member disposed between the light source attachment member and the protruding member, the gap restricting member restricting a gap between the light source attachment member and the protruding member so as to form an air space that acts as the heat insulating layer therebetween. With this configuration, by restricting the gap between the light source attachment member and the protruding member by the gap restricting member, an air space having a certain thickness can be secured between the light source attachment member and the protruding member, and therefore, it is possible to reliably achieve the heat insulating effect.

(10) A plurality of the gap restricting members are arranged at intervals. With this configuration, as compared with a configuration in which the gap restricting member extends along the light source attachment member and the protruding member, the contact area of the gap restricting member with the light source attachment member and the protruding member becomes smaller, and an air space is formed between respective adjacent gap restricting members. As a result, a greater heat insulating property can be achieved.

(11) Between the light source attachment member and the protruding member, a heat insulating member having the heat insulating layer is interposed. With this configuration, by using a heat insulating member having the heat insulating layer, a higher heat insulating effect can be achieved as compared with the case in which an air space is used as the heat insulating layer.

(12) The protruding member is integrally formed with the exterior member. With this configuration, it is possible to reduce the number of parts and to make the assembly process easier as compared with the case in which the protruding member is provided as a separate part. Although heat can be transferred from the protruding member to the exterior member more easily as compared with the case in which the protruding member and the exterior member are separate parts, and there is a possibility that the temperature of the exterior member would increase, because the heat insulating layer is interposed between the protruding member and the light source attachment member, the heat transfer from the light source to the exterior member is mitigated. As a result, an increase in temperature of the exterior member is effectively mitigated.

(13) The exterior member is made of a metal. With this configuration, the rigidity of the exterior member can be improved. Therefore, this configuration is effective when the display device is made larger. When the exterior member is made of a metal, the heat conductivity becomes higher than an exterior member made of a synthetic resin. However, by providing the heat insulating layer between the protruding member and the light source attachment member, heat from the light source is less likely to be transferred to the exterior member, and the temperature increase is effectively mitigated.

Effects of the Invention

With the present invention, it is possible to mitigate an increase in temperature of the exterior member.

DETAILED DESCRIPTION OF EMBODIMENT

Embodiment 1

Figure 2:
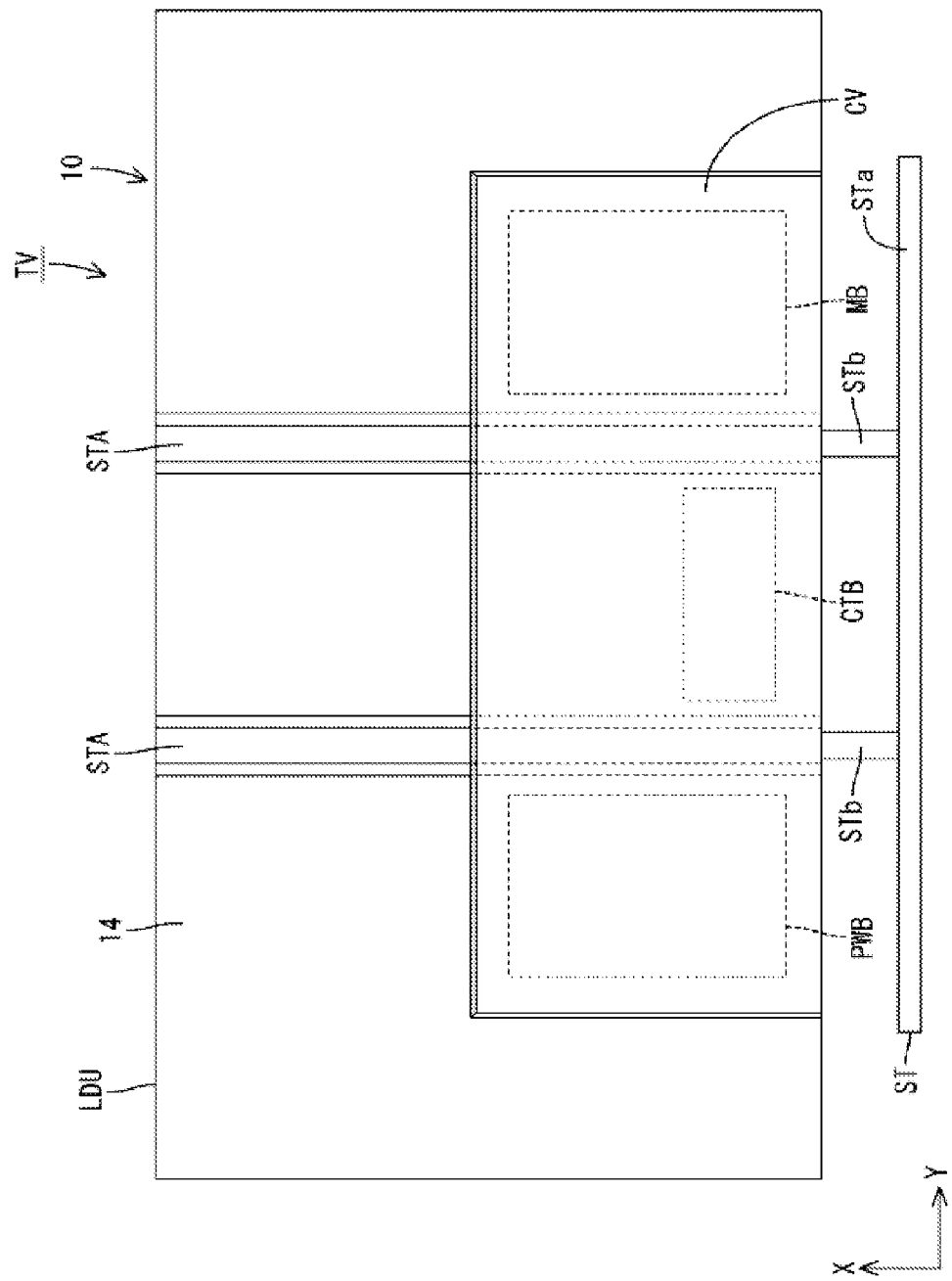
FIG. 2 is a rear view of the television receiver and the liquid crystal display device.
Figure 3:
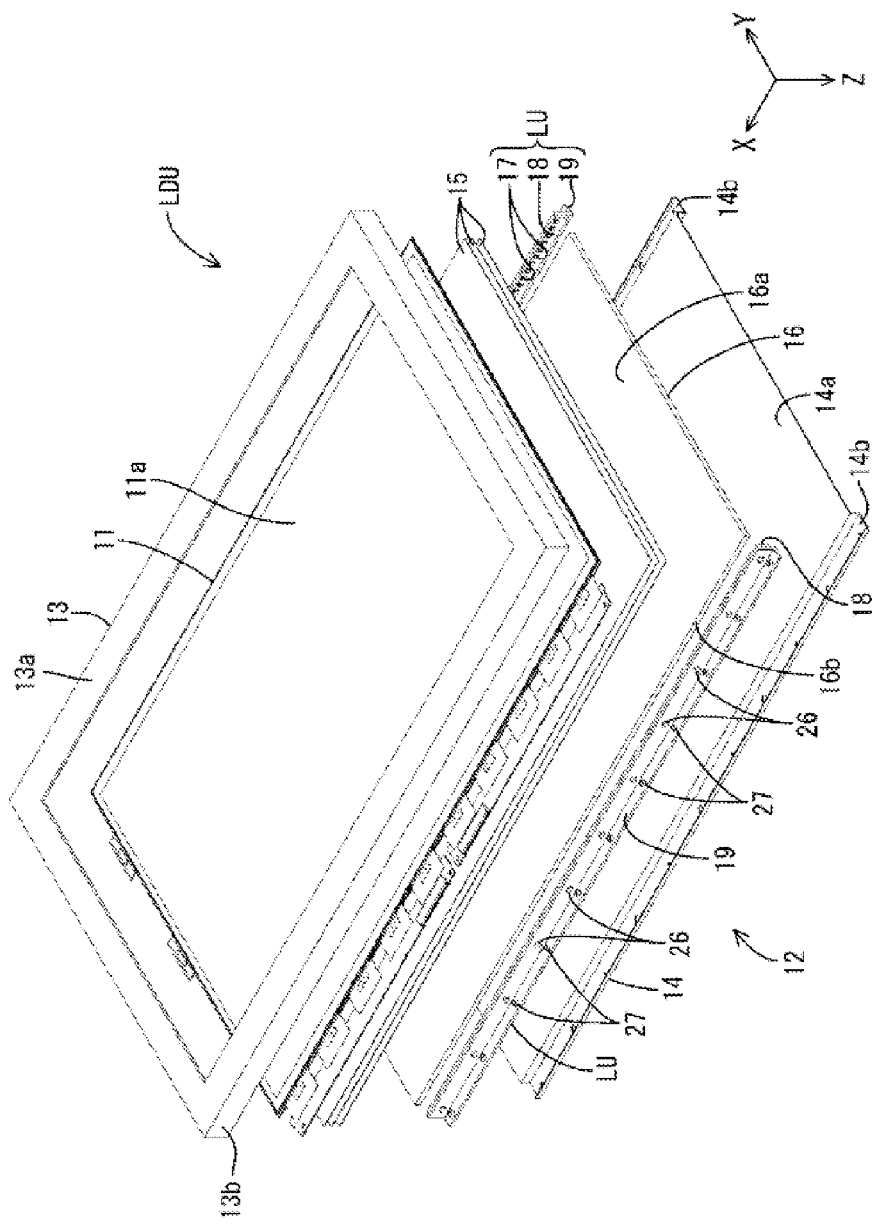
FIG. 3 is an exploded perspective view showing a schematic configuration of a liquid crystal display unit that constitutes a part of the liquid crystal display device.
Figure 4:
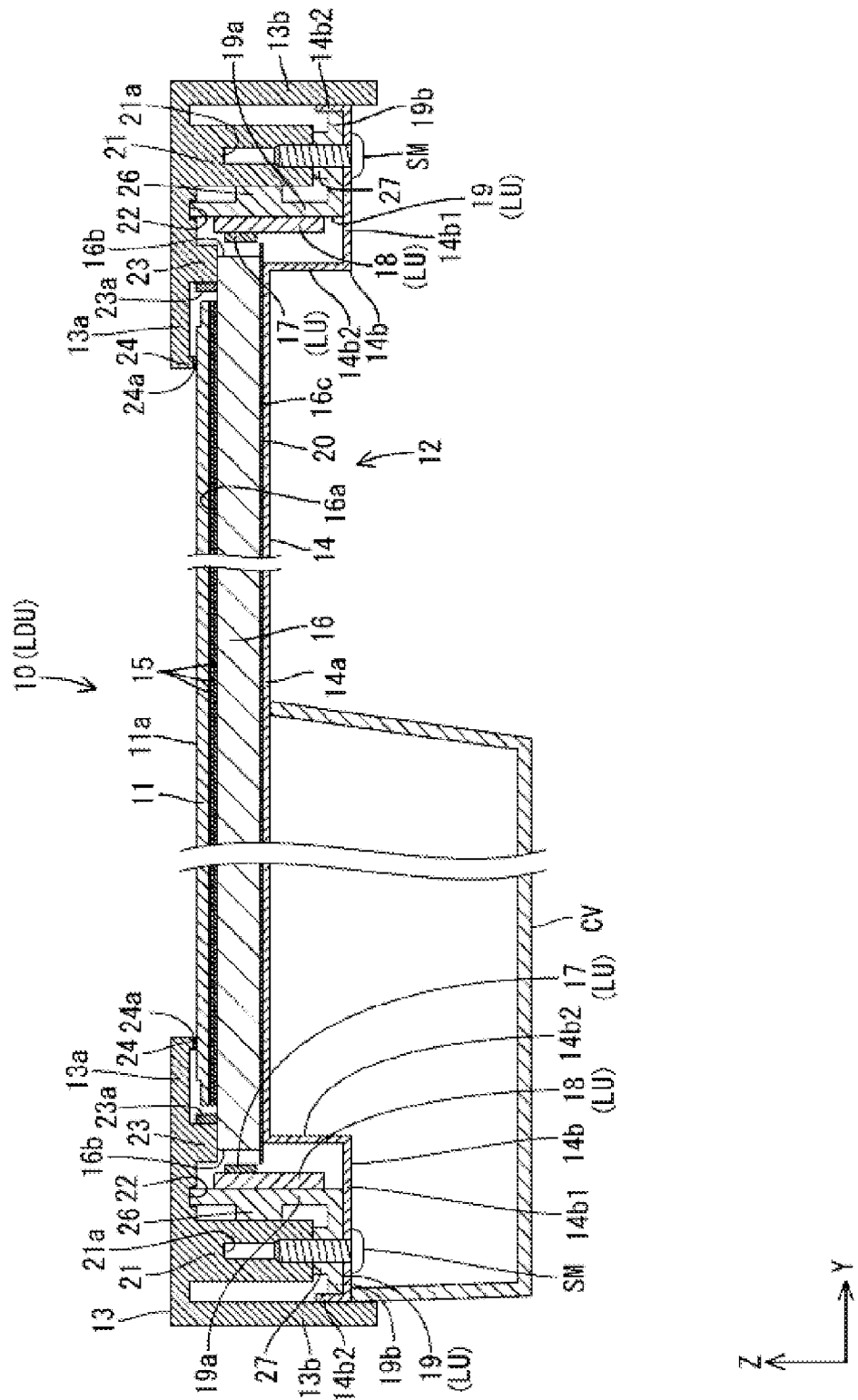
FIG. 4 is a cross-sectional view that shows a cross-sectional configuration of the liquid crystal display device along the shorter side direction.

Embodiment 1 of the present invention will be described with reference to FIGS. 1 to 9. In the present embodiment, a liquid crystal display device 10 will be described as an example. The drawings indicate an X axis, a Y axis, and a Z axis in a portion of the drawings, and each of the axes indicates the same direction for the respective drawings. The upper side of FIG. 4 is the front side, and the lower side is the rear side.

Figure 1:
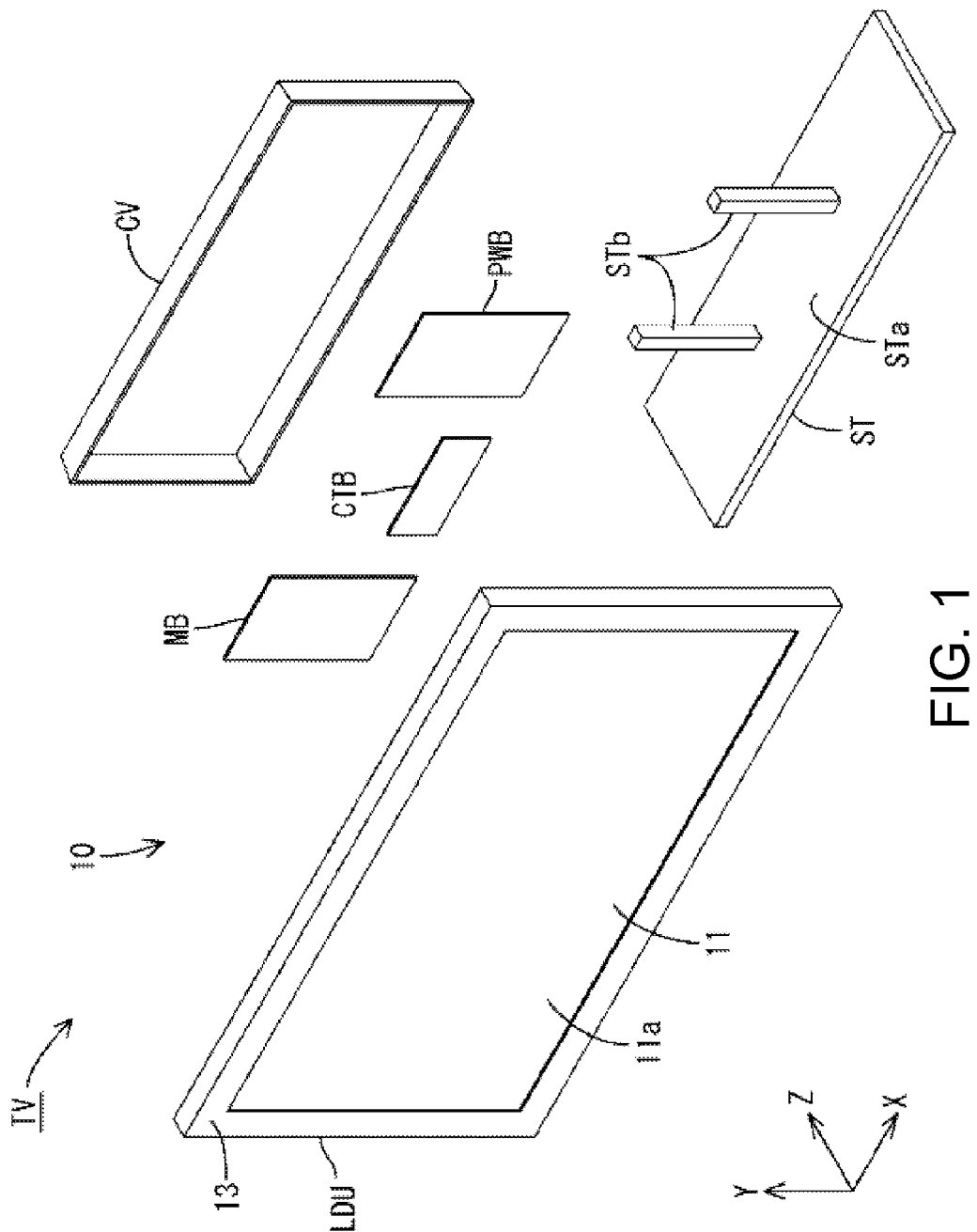
FIG. 1 is an exploded perspective view that shows a schematic configuration of a television receiver and a liquid crystal display device according to Embodiment 1 of the present invention.

As shown in FIG. 1, a television receiver TV of the present embodiment includes: a liquid crystal display unit (display unit) LDU; various boards PWB, MB, and CTB that are attached to the back side (rear side) of the liquid crystal display unit LDU; a cover member CV attached to the rear side of the liquid crystal display unit LDU so as to cover the various boards PWB, MB, and CTB; and a stand ST. The television receiver TV is supported by the stand ST such that the display surface of the liquid crystal display unit LDU is parallel to the vertical direction (Y axis direction). The liquid crystal display device 10 of the present embodiment is obtained by removing at least the configuration for receiving television signals (such as a tuner part of the main board MB) from the television receiver TV having the above-mentioned configuration. As shown in FIG. 3, the liquid crystal display unit LDU is formed to be a horizontally-long quadrangle (rectangular shape) as a whole, and includes a liquid crystal panel 11 that is a display panel, and a backlight device (illumination device) 12 that is an external light source. The liquid crystal panel 11 and the backlight device 12 are held as one component by a frame (first exterior member) 13 and a chassis (second exterior member) 14 that are an exterior member that constitutes the exterior of the liquid crystal display device 10. The chassis 14 of the present embodiment constitutes a part of the exterior member and also a part of the backlight device 12.

First, the configuration of the rear side of the liquid crystal display device 10 will be explained. As shown in FIG. 2, on the rear side of the chassis 14 that constitutes the rear exterior of the liquid crystal display device 10, a pair of stand attachment members STA extending along the Y axis direction is attached at two locations that are separated from each other along the X axis direction. The cross-sectional shape of these stand attachment members STA is a substantially channel shape that opens toward the chassis 14, and a pair of support columns STb of the stand ST is inserted into spaces formed between the stand attachment members STA and the chassis 14, respectively. Wiring members (such as electric wires) connected to LED substrates 18 of the backlight device 12 run through spaces inside of the respective stand attachment members STA. The stand ST is constituted of a base STa that is disposed in parallel with the X axis direction and the Z axis direction, and a pair of support columns STb standing on the base STa along the Y axis direction. The cover member CV is made of a synthetic resin, and is attached so as to cover about a half of the lower part of the rear side of the chassis 14 of FIG. 2, while crossing over the pair of stand attachment members STA along the X axis direction. Between the cover member CV and the chassis 14, a component housing space is provided to house the components mentioned below such as various boards PWB, MB, and CTB.

As shown in FIG. 2, the various boards PWB, MB, and CTB include a power supply board PWB, a main board MB, and a control board CTB. The power supply board PWB is a power source for the liquid crystal display device 10, and can supply driving power to other boards MB and CTB, LEDs 17 of the backlight device 12, and the like. Therefore, the power supply board PWB doubles as an LED driver board that drives the LEDs 17. The main board MB at least has a tuner part that can receive television signals, and an image processing part that conducts image-processing on the received television signals (neither the tuner part or the image processing part is shown in the figure), and can output the processed image signals to the control board CTB described below. When the liquid crystal display device 10 is connected to a not-shown external video playback device, an image signal from the video playback device is inputted into the main board MB, and the main board MB can output the image signal to the control board CTB after processing the signal at the image processing part. The control board CTB has the function of converting the image signal inputted from the main board MB to a signal for driving liquid crystal, and supplying the converted signal for liquid crystal to the liquid crystal panel 11.

As shown FIG. 3, in the liquid crystal display unit LDU that constitutes a part of the liquid crystal display device 10, main constituting components thereof are housed in a space formed between the frame (front frame) 13 that constitutes the front exterior, and the chassis (rear chassis) 14 that constitutes the rear exterior. The main constituting components housed between the frame 13 and the chassis 14 at least include the liquid crystal panel 11, optical members 15, a light guide plate 16, and LED units (light source units) LU. Among them, the liquid crystal panel 11, the optical members 15, and the light guide plate 16 are stacked on top of the other, and are held by being sandwiched by the frame 13 disposed on the front side and the chassis 14 disposed on the rear side. The backlight device 12 is constituted of the optical members 15, the light guide plate 16, the LED units LU, and the chassis 14, and has the configuration that is obtained by removing the liquid crystal panel 11 and the frame 13 from the liquid crystal display unit LDU described above. A pair of LED units LU, which is a part of the backlight device 12, is disposed between the frame 13 and the chassis 14 so as to be on the respective sides of the light guide plate 16 in the shorter side direction (Y axis direction). Each LED unit LU is constituted of the LEDs 17, which are the light source, an LED substrate (light source substrate) 18 on which the LEDs 17 are mounted, and a heat dissipating member (heat spreader, light source attachment member) 19 to which the LED substrate 18 is attached. The respective constituting components will be explained below.

As shown in FIG. 3, the liquid crystal panel 11 is formed in a horizontally-long quadrangular shape (rectangular shape) in a plan view, and is configured by bonding a pair of glass substrates having high light transmittance to each other with a prescribed gap therebetween, and by injecting liquid crystal between the two substrates. In one substrate (array substrate), switching elements (TFTs, for example) connected to source wiring lines and gate wiring lines that are intersecting with each other, pixel electrodes connected to the switching elements, an alignment film, and the like are provided, and in the other substrate (CF substrate), color filters having respective colored portions such as R (red), G (green), and B (blue) arranged in a prescribed pattern, an opposite electrode, an alignment film, and the like are provided. The liquid crystal panel 11 is stacked on the front side of the optical members 15 described below, and the rear surface thereof (outer surface of a polarizing plate on the rear side) is in close contact with the optical members 15 with almost no gap. With this configuration, it is possible to prevent dust from entering a space between the liquid crystal panel 11 and the optical members 15. A display surface 11a of the liquid crystal panel 11 is constituted of a display region that is in the center of the surface and that can display images, and a non-display region that is in the outer edges of the surface and that is formed in a frame shape surrounding the display region. The liquid crystal panel 11 is connected to the control board CTB via a driver part for the liquid crystal and a flexible substrate, and based on signals inputted from the control board CTB, images are displayed in the display region on the display surface 11a. Polarizing plates are respectively provided on outer sides of the two substrates.

As shown in FIG. 3, the optical members 15 have a horizontally-long quadrangular shape in a plan view as in the liquid crystal panel 11, and the size thereof (shorter side dimension and longer side dimension) is the same as that of the liquid crystal panel 11. The optical members 15 are stacked on the front side (side from which light is emitted) of the light guide plate 16 described below, and are sandwiched between the liquid crystal panel 11 described above and the light guide plate 16. Each of the optical members 15 is a sheet-shaped member, and the optical members 15 are constituted of three sheets stacked together. Specific types of optical members 15 include a diffusion sheet, a lens sheet, a reflective polarizing sheet, and the like, for example, and it is possible to appropriately choose any of these as optical members 15.

The light guide plate 16 is made of a synthetic resin (an acrylic resin such as PMMA or a polycarbonate, for example) with a higher refractive index than air and almost completely transparent (excellent light transmission). As shown in FIG. 3, the light guide plate 16 is a plate-shaped member that has a horizontally-long quadrangular shape in a plan view as in the liquid crystal panel 11 and the optical members 15 and that is thicker than the optical members 15. The longer side direction of the main surface corresponds to the X-axis direction, and the shorter side direction thereof corresponds to the Y axis direction, respectively. The thickness direction perpendicular to the main surface corresponds to the Z axis direction. The light guide plate 16 is placed on the rear side of the optical members 15, and is sandwiched between the optical members 15 and the chassis 14. As shown in FIG. 4, in the light guide plate 16, at least the shorter side dimension thereof is greater than the respective shorter side dimensions of the liquid crystal panel 11 and the optical members 15, and the light guide plate 16 is disposed such that respective edges in the shorter side direction (respective edges along the longer side direction) protrude toward outside beyond respective edges of the liquid crystal panel 11 and the optical members 15 (so as not to overlap in a plan view). At the respective sides in the shorter side direction of the light guide plate 16, a pair of LED units LU is disposed so as to have the light guide plate 16 interposed therebetween in the Y axis direction, and light from the LEDs 17 enters the respective shorter side edges of the light guide plate 16. The light guide plate 16 has the function of guiding therethrough the light of LEDs 17 that entered from the respective shorter side edges and emitting the light toward the optical members 15 (front side).

Of the main surfaces of the light guide plate 16, the surface facing the front side (surface facing the optical members 15) is a light output surface 16a that emits light from the interior toward the optical members 15 and the liquid crystal panel 11. Of the outer end faces continued from the main surfaces of the light guide plate 16, two end faces on the longer sides that are longer in the X axis direction (two end faces at the respective edges in the shorter side direction) respectively face the LEDs 17 (LED substrates 18) with a prescribed space therebetween, and these two end faces are a pair of light-receiving surfaces 16b through which light from the LEDs 17 enters. The light-receiving surfaces 16b are each on a plane parallel to that defined by the X axis direction and the Z axis direction (main plate surface of the LED substrate 18), and are substantially perpendicular to the light output surface 16a. The direction at which the LEDs 17 and the light-receiving surfaces 16b are aligned with respect to each other corresponds to the Y axis direction, and is parallel to the light output surface 16a.

As shown in FIG. 4, on the rear side of the light guide plate 16, or in other words, on a surface 16c that is opposite to the light output surface 16a (surface facing the chassis 14), a light guide reflective sheet 20 is disposed so as to cover almost the entire area of the surface 16c. The light guide reflective sheet 20 can reflect light, which exited out from the surface 16c toward the rear side, back to the front side. In other words, the light guide reflective sheet 20 is sandwiched between the chassis 14 and the light guide plate 16. The light guide reflective sheet 20 is made of a synthetic resin, and the surface thereof is a highly reflective white. The shorter side dimension of the light guide reflective sheet 20 is greater than the shorter side dimension of the light guide plate 16, and the respective edges thereof protrude beyond the light-receiving surfaces 16b toward the LEDs 17. With the protruding portions of the light guide reflective sheet 20, light that travels diagonally from the LEDs 17 toward the chassis 14 can be reflected efficiently, thereby directing the light toward the light-receiving surfaces 16b of the light guide plate 16. On at least one of the light output surface 16a and the opposite surface 16c of the light guide plate 16, a reflective portion (not shown) that reflects light from the interior or a diffusion portion (not shown) that diffuses light from the interior is patterned so as to have a prescribed in-plane distribution, thereby controlling light outputted from the light output surface 16a to have an even distribution in the plane.

Next, configurations of the LEDs 17, the LED substrate 18, and the heat dissipating member 19 that constitute the LED unit LU will be explained in this order. As shown in FIGS. 3 and 4, the LEDs 17 of the LED units LU have a configuration in which an LED chip is sealed with a resin on a substrate part that is affixed to the LED substrate 18. The LED chip mounted on the substrate part has one type of primary light-emitting wavelength, and specifically, only emits blue light. On the other hand, the resin that seals the LED chip has a fluorescent material dispersed therein, the fluorescent material emitting light of a prescribed color by being excited by the blue light emitted from the LED chip. This combination of the LED chip and the fluorescent material causes white light to be emitted overall. As the fluorescent material, a yellow fluorescent material that emits yellow light, a green fluorescent material that emits green light, and a red fluorescent material that emits red light, for example, can be appropriately combined, or one of them can be used on its own. The LEDs 17 are of a so-called top-type in which the side opposite to that mounted onto the LED substrate 18 is the light-emitting surface.

As shown in FIGS. 3 and 4, the LED substrates 18 of the LED units LU are each formed in a narrow plate shape that extends along the longer side direction (X axis direction, longitudinal direction of the light-receiving surface 16b) of the light guide plate 16, and are housed between the frame 13 and the chassis 14 such that each main surface thereof is parallel to the X axis direction and the Z axis direction, or in other words, in parallel with the light-receiving surfaces 16b of the light guide plate 16. On the inner main surfaces of the respective LED substrates 18, or in other words, on the surfaces facing the light guide plate 16 (surfaces opposing the light guide plate 16), the LEDs 17 having the above-mentioned configuration are mounted, and these surfaces are mounting surfaces 18a. On the mounting surfaces 18a of the LED substrates 18, a plurality of LEDs 17 are arranged in a row (in a line) along the length direction (X axis direction) at prescribed intervals. That is, a plurality of LEDs 17 are arranged at intervals along the longer side direction on the respective longer edges of the backlight device 12. The intervals between respective adjacent LEDs 17 along the X axis direction are substantially equal to each other, or in other words, the LEDs 17 are arranged at substantially the same pitch. The arrangement direction of the LEDs 17 corresponds to the length direction (X axis direction) of the LED substrates 18. On the mounting surfaces 18a of the LED substrates 18, wiring patterns (not shown) made of a metal film (such as copper foil) are formed. The wiring patterns extend along the X axis direction and cross over the group of LEDs 17 so as to connect the adjacent LEDs 17 to each other in series. By connecting terminals that are formed at respective ends of the wiring patterns to the power supply board PWB via wiring members such as connectors and electric wires, driving power is supplied to the respective LEDs 17. Because the pair of LED substrates 18 is housed between the frame 13 and the chassis 14 such that the respective mounting surfaces 18a for the LEDs 17 face each other, the primary light-emitting surfaces of the respective LEDs 17 that are mounted on the two LED substrates 18 face each other, and the optical axis of each LED 17 substantially coincides with the Y axis direction. The base member of the LED substrate 18 is made of a metal such as aluminum, for example, and the above-described wiring pattern (not shown) is formed on the surface via an insulating layer. The base member of the LED substrate 18 may alternatively be formed of an insulating material such as ceramics.

As shown in FIGS. 3 and 4, the heat dissipating member 19 of the LED unit LU is made of a metal such as aluminum, for example, that has excellent heat conductivity, and is formed by bending a metal sheet member, thereby having a bent shape with a substantially L-shaped cross section as a whole. The heat dissipating members 19 are each constituted of an LED attachment section (light source attachment section) 19a to which the LED substrate 18 is attached, and a heat dissipating section 19b that makes surface-to-surface contact with the plate surface of the chassis 14.

As shown in FIGS. 3 and 4, the LED attachment section 19a is in a plate shape that runs parallel to the plate surface of the LED substrate 18 and the light-receiving surface 16b of the light guide plate 16, and the longer side direction corresponds to the X axis direction, the shorter side direction corresponds to the Z axis direction, and the thickness direction corresponds to the Y axis direction, respectively. On the inner plate surface of the LED attachment section 19a, or in other words, on the plate surface that faces the light guide plate 16, the LED substrate 18 is attached. While the longer side dimension of the LED attachment section 19a is substantially the same as the longer side dimension of the LED substrate 18, the shorter side dimension of the LED attachment section 19a is greater than the shorter side dimension of the LED substrate 18. The respective edges of the LED attachment section 19a in the shorter side direction protrude toward outside beyond the respective edges of the LED substrate 18 along the Z axis direction. The outer plate surface of the LED attachment section 19a, or in other words, the plate surface opposite to the side to which the LED substrate 18 is attached faces a protruding member 21 of the frame 13, which will be later described. That is, the LED attachment section 19a is interposed between the protruding member 21 of the frame 13 and the light guide plate 16. The LED attachment section 19a is configured to rise from the inner edge, or in other words, the edge closer to the LEDs 17 (light guide plate 16) of the heat dissipating section 19b described below toward the front side, or toward the frame 13 along the Z axis direction.

As shown in FIGS. 3 and 4, the heat dissipating section 19b is formed in a plate shape that is parallel to the plate surface of the chassis 14, and the longer side direction corresponds to the X axis direction, the shorter side direction corresponds to the Y axis direction, and the thickness direction corresponds to the Z axis direction, respectively. The rear surface of the heat dissipating section 19b, or in other words, the plate surface facing the chassis 14, is entirely in contact with the plate surface of the chassis 14. As a result, heat generated from the LEDs 17 due to the illumination is transferred to the chassis 14 via the LED substrate 18, the LED attachment section 19a, and the heat dissipating section 19b, thereby being dissipated to the outside of the liquid crystal display device 10 efficiently, and therefore, the heat is less likely to be trapped inside. The longer side dimension of the heat dissipating section 19b is substantially the same as that of the LED attachment section 19a. The front plate surface of the heat dissipating section 19b, or in other words, the plate surface opposite to the side that is in contact with the chassis 14, faces the protruding member 21 of the frame 13, which will be later described. That is, the heat dissipating section 19b is interposed between the protruding member 21 of the frame 13 and the chassis 14. The heat dissipating section 19b is configured to be affixed to the protruding member 21 by a screw SM, and has an insertion hole 19b1 for having the screw SM therein.

The heat dissipating section 19b protrudes from the rear edge, or in other words, the edge closer to the chassis 14, of the LED attachment section 19a toward the outside, or in other words, in the direction opposite to the light guide plate 16 along the Y axis direction.

Next, the configurations of the frame 13 and the chassis 14 that constitute the exterior member will be explained. The frame 13 and the chassis 14 are both made of a metal such as aluminum, for example, and have higher mechanical strength (rigidity) and heat conductivity as compared with the case in which the frame 13 and the chassis 14 are made of a synthetic resin. As shown in FIG. 3, the frame 13 and the chassis 14 hold the liquid crystal panel 11, the optical members 15, and the light guide plate 16, which are stacked on top of the other, by sandwiching these stacked components from the front side and the rear side, while housing the pair of LED units LU on the respective edges in the shorter side direction.

As shown in FIG. 3, the frame 13 is formed in a horizontally-long frame shape as a whole so as to surround the display region on the display surface 11a of the liquid crystal panel 11. The frame 13 is constituted of a panel pressing portion 13a that is disposed in parallel with the display surface 11a of the liquid crystal panel 11 and that presses the liquid crystal panel 11 from the front side, and side walls 13b that protrude from the outer edges of the panel pressing portion 13a toward the rear side, and has a substantially L-shaped cross section. The panel pressing portion 13a is formed in a horizontally-long frame shape as in the outer edge portion (non-display region, frame portion) of the liquid crystal panel 11, and can press almost the entire outer edges of the liquid crystal panel 11 from the front side. The panel pressing portion 13a is made wide enough to cover the respective longer side edges of the light guide plate 16 that are located outside of the respective longer side edges of the liquid crystal panel 11 in the Y axis direction, and the respective LED units LU from the front side, in addition to the outer edges of the liquid crystal panel 11. The front outer surface of the panel pressing portion 13a (surface opposite to the side facing the liquid crystal panel 11) is exposed to the outside on the front side of the liquid crystal display device 10 as in the display surface 11a of the liquid crystal panel 11, and constitutes the front side of the liquid crystal display device 10 together with the display surface 11a of the liquid crystal panel 11. On the other hand, the side walls 13b take the form of a substantially angular enclosure that rises from the outer edges of the panel pressing portion 13a toward the rear side. The side walls 13b can enclose the liquid crystal panel 11, the optical members 15, the light guide plate 16, and the LED units LU that are housed therein along almost the entire periphery thereof, and also can enclose the chassis 14 on the rear side along almost the entire periphery thereof. The outer surfaces of the side walls 13b along the circumference direction of the liquid crystal display device 10 are exposed to the outside in the circumference direction of the liquid crystal display device 10, and constitute the top face, the bottom face, and the side faces of the liquid crystal display device 10.

As shown in FIG. 4, in a pair of longer side portions of the panel pressing portion 13a having a horizontally-long frame shape, protruding members 21 for attaching the LED units LU are integrally formed in positions further back from the side walls 13b (closer to the light guide plate 16). The protruding members 21 protrude from the respective longer side portions of the panel pressing portion 13a toward the rear side along the Z axis direction, and are each formed in a substantially block shape that is horizontally long and that extends along the longer side direction (X axis direction). The protruding members 21 are respectively interposed between the side walls 13b of the frame 13 and the LED attachment sections 19a of the heat dissipating members 19 of the LED units LU with respect to the Y axis direction. In the Z axis direction, the protruding member 21 is interposed between the panel pressing portion 13a of the frame 13 and the chassis 14. The protruding member 21 has a groove 21a formed therein that opens toward the rear side and that is used for attaching a screw (holding member) SM with which the LED unit LU and the like are affixed. The groove 21a is formed over the substantially entire length of the protruding member 21 along the longitudinal direction (X axis direction).

As shown in FIG. 4, in the respective longer side portions of the panel pressing portion 13a, positioning portions 22 that can engage the LED attachment sections 19a of the heat dissipating members 19 of the respective LED units LU are formed in positions further back from the respective protruding members 21 (closer to the light guide plate 16). The positioning portions 22 are formed by making a groove-shaped recess in the inner surfaces (rear surfaces) in the respective longer side portions of the panel pressing portion 13a, and the width thereof is slightly greater than the thickness of the LED attachment section 19a. By the positioning portions 22 engaging the LED attachment sections 19a, respectively, the LED units LU and the light guide plate 16 are positioned with respect to each other in the Y axis direction. The positioning portion 22 is formed to be long enough to allow the entire LED attachment section 19a to be inserted therein.

As shown in FIG. 4, in the respective longer side portions of the panel pressing portion 13a, light-shielding supporting portions 23 are respectively formed integrally with the panel pressing portion 13a in positions further back from the respective positioning portions 22 (closer to the light guide plate 16). The light-shielding supporting portions 23 are interposed between the liquid crystal panel 11 and the LEDs 17. The light-shielding supporting portions 23 respectively protrude from the respective longer side portions of the panel pressing portion 13a toward the rear side, and are each formed in a substantially block shape that is horizontally long and that extends along the longer side direction (X axis direction). By blocking spaces between the LEDs 17 and the respective end faces of the liquid crystal panel 11 and the optical members 15 on the side facing the LEDs 17, the light-shielding supporting portions 23 prevent light from the LEDs 17 from directly entering the respective end faces of the liquid crystal panel 11 and the optical members 15 without passing through the light guide plate 16. That is, the light-shielding supporting portions 23 have a so-called light-shielding function. The light-shielding supporting portions 23 are configured such that the protrusion end faces thereof make contact with portions of the light guide plate 16 that protrude beyond the liquid crystal panel 11 and the optical members 15 toward the LEDs 17. Therefore, the light-shielding supporting portion 23 can support the light guide plate 16 by sandwiching the light guide plate 16 with the chassis 14 described below. The portions of the light guide plate 16 that make contact with the light-shielding supporting portions 23 are edge portions (longer side edges) having the light-receiving surfaces 16b that face the LEDs 17, and therefore, by supporting the light guide plate 16 with the light-shielding supporting portions 23, the positional relationship between the LEDs 17 and the light-receiving surfaces 16b in the Z axis direction can be stably maintained. The forming areas of the light-shielding supporting portions 23 in the Y axis direction (direction in which the LEDs 17 and the liquid crystal panel 11 are arranged) are set such that the light-shielding supporting portions 23 overlap the longer side edge portions of the light guide plate 16 and the longer side edge portions of a bottom plate 14a of the chassis 14 in a plan view, and such that the light-shielding supporting portions 23 protrude beyond the light-receiving surfaces 16b of the light guide plate 16 toward the LEDs 17. On the surface of each light-shielding supporting portion 23 facing the liquid crystal panel 11, a buffer member 23a is provided, and the buffer member 23a can receive the end face of the liquid crystal panel 11. In the assembly process, the buffer members 23a allow the liquid crystal panel 11 to be positioned with respect to the direction along the display surface 11a thereof.

As shown in FIG. 4, in the inner edge of the panel pressing portion 13a, a pressing protrusion 24 protruding toward the rear side, or in other words, toward the liquid crystal panel 11, is formed integrally with the panel pressing portion 13a. A buffer member 24a is attached to the protrusion end face of the pressing protrusion 24, and the pressing protrusion 24 can press the liquid crystal panel 11 via the buffer member 24a from the front side. The pressing protrusions 24 are respectively formed in the two longer side portions and the two shorter side portions in the panel pressing portion 13a.

As shown in FIG. 3, the chassis 14 is formed in a substantially shallow plate shape that is horizontally long as a whole so as to almost entirely cover the light guide plate 16, the LED units LU, and the like from the rear side. The rear outer surface of the chassis 14 (surface opposite to the side facing the light guide plate 16 and the LED units LU) is exposed to the outside on the rear side of the liquid crystal display device 10, and constitutes the rear surface of the liquid crystal display device 10. The chassis 14 is constituted of a bottom plate 14a formed in a horizontally-long quadrangular shape as in the light guide plate 16, and a pair of LED housing portions (light source housing portions) 14b that protrude from the respective longer side edges of the bottom plate 14a toward the rear side in a step-like shape and that house the LED units LU, respectively. The bottom plate 14a is formed in a flat sheet shape that can receive the rear side of a large center portion of the light guide plate 16 that does not include the respective longer side edges, or in other words, the bottom plate 14a constitutes a receiving portion for the light guide plate 16.

Figure 6:
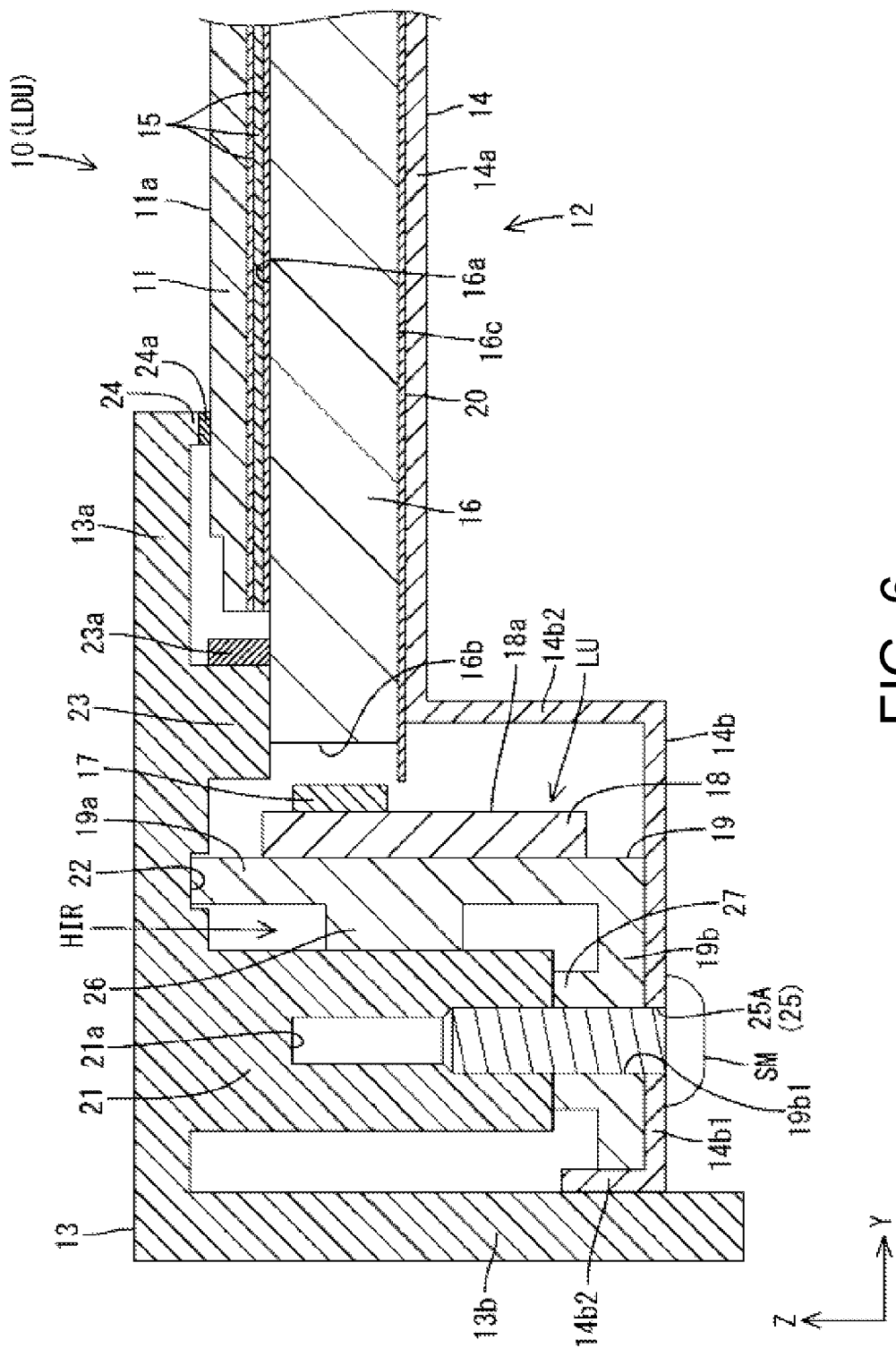
FIG. 6 is a cross-sectional view along the line vi-vi of FIG. 5.
Figure 7:
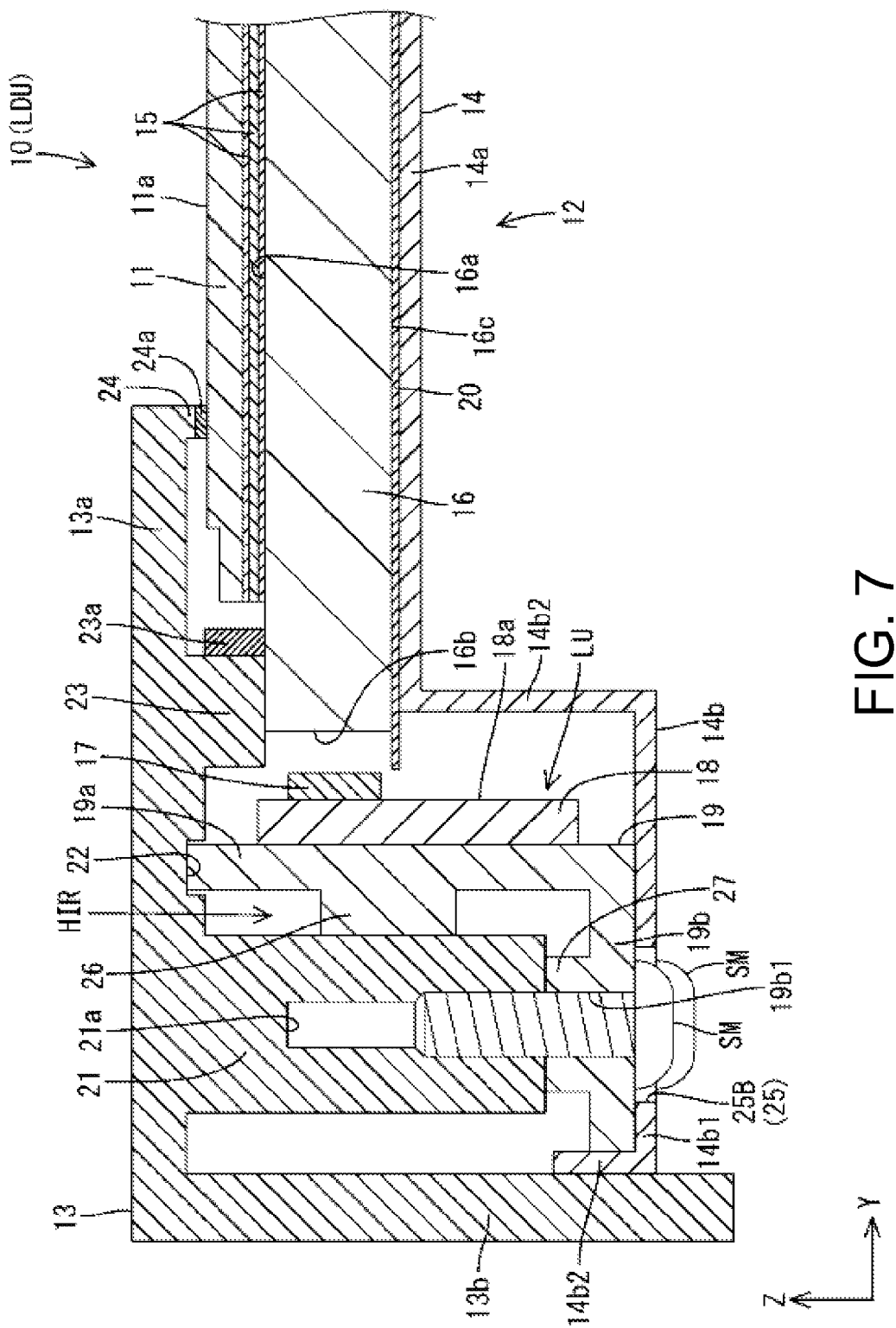
FIG. 7 is a cross-sectional view along the line vii-vii of FIG. 5.

As shown in FIGS. 3 and 4, the LED housing portions 14b are disposed at the respective sides of the bottom plate 14a in the shorter side direction, and can house the LED units LU therein by being recessed toward the rear side from the bottom plate 14a. The LED housing portions 14b are each constituted of a housing portion bottom plate 14b1 that is in parallel with the bottom plate 14a, and a pair of housing portion side walls 14b2 that rise from the respective edges of the housing portion bottom plate 14b1 toward the front side, and of the pair of the housing portion side walls 14b2, the inner side wall 14b2 is continued to the bottom plate 14a. As shown in FIG. 6, on the housing portion bottom plate 14b1 in the LED housing portion 14b, the heat dissipating section 19b of the heat dissipating member 19 of the LED unit LU is disposed so as to make surface-to-surface contact with the plate surface of the housing portion bottom plate 14b1. The housing portion bottom plate 14b1 has an insertion hole 25 formed therein as an opening, and a screw SM for affixing the heat dissipating section 19b and the housing portion bottom plate 14b1 to the protruding member 21 is to be inserted through the insertion hole 25. The insertion holes 25 include an insertion hole 25A for fastening a plurality of parts together that is large enough to allow only the shaft portion of the screw SM to pass through as shown in FIG. 6, and an insertion hole 25B for the heat dissipating member that is large enough to allow not only the shaft portion, but also the head of the screw SM to pass through as shown in FIG. 7. The screw SM going through the former fastens both of the heat dissipating section 19b and the housing portion bottom plate 14b1 to the protruding member 21, while the screw SM going through the latter fastens only the heat dissipating section 19b to the protruding member 21.

As shown in FIG. 6, the heat dissipating member 19 of the LED unit LU of the present embodiment is attached to the protruding member 21 of the frame 13 via a heat insulating layer HIR. With this configuration, heat transfer from the heat dissipating member 19 to the protruding member 21 is mitigated, and therefore, the frame 13 having the protruding member 21 integrally formed therewith is less susceptible to a temperature increase that is caused by the heat generated from the LEDs 17. Specifically, the heat dissipating member 19 has a bent shape having a substantially L-shaped cross section to correspond to the outer shape of the protruding member 21, and between the protruding member 21 and the surface of the heat dissipating member 19 facing the protruding member 21, a gap having a substantially L-shaped cross-section is created in almost the entire area, and a heat insulating layer HIR is present in the gap. The heat insulating layer HIR having a substantially L-shaped cross section is interposed between the LED attachment section 19a of the heat dissipating member 19 and the protruding member 21, and is also interposed between the heat dissipating section 19b of the heat dissipating member 19 and the protruding member 21.

Figure 5:
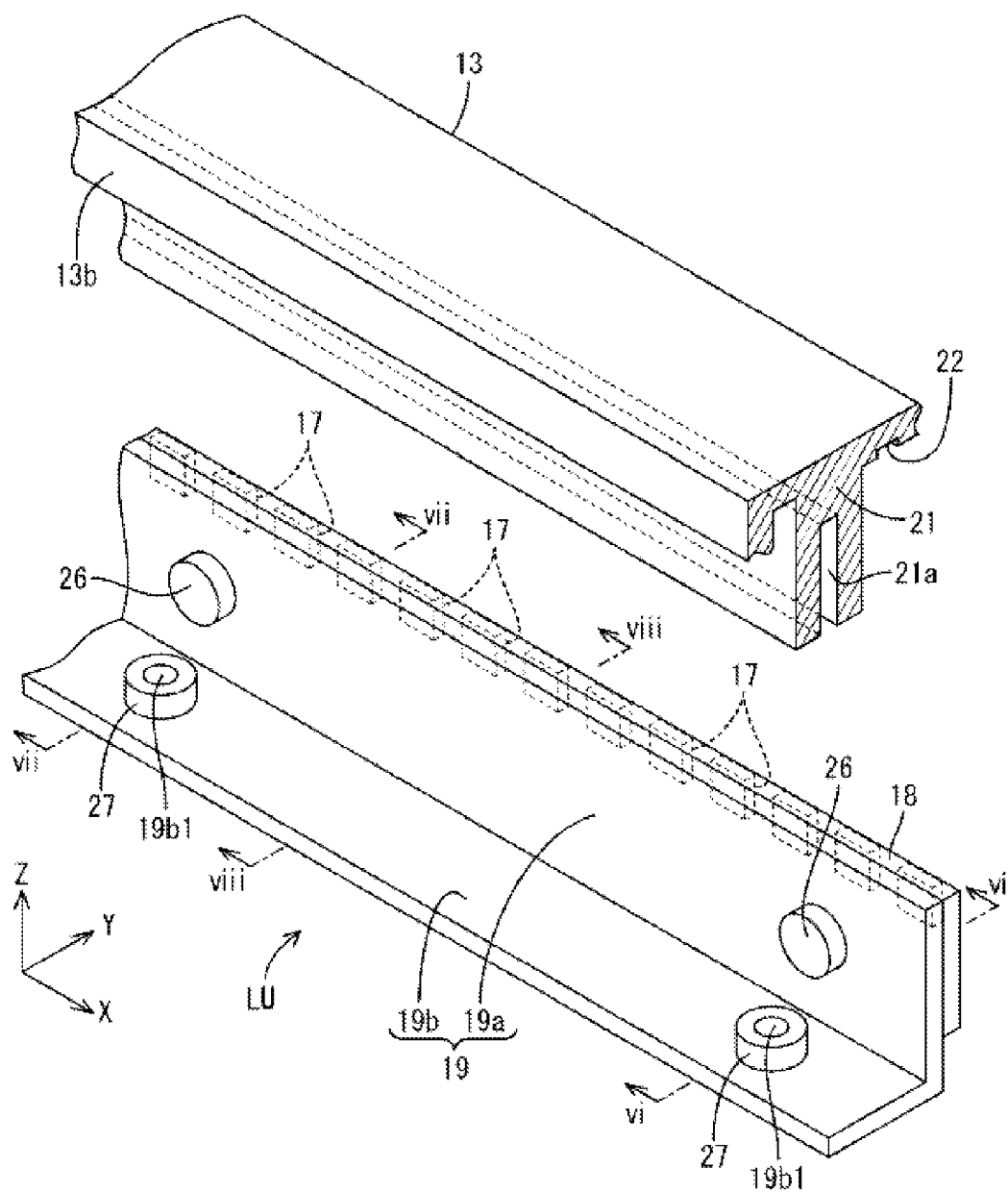
FIG. 5 is an exploded perspective view showing a protruding member of a frame and an LED unit.
Figure 8:
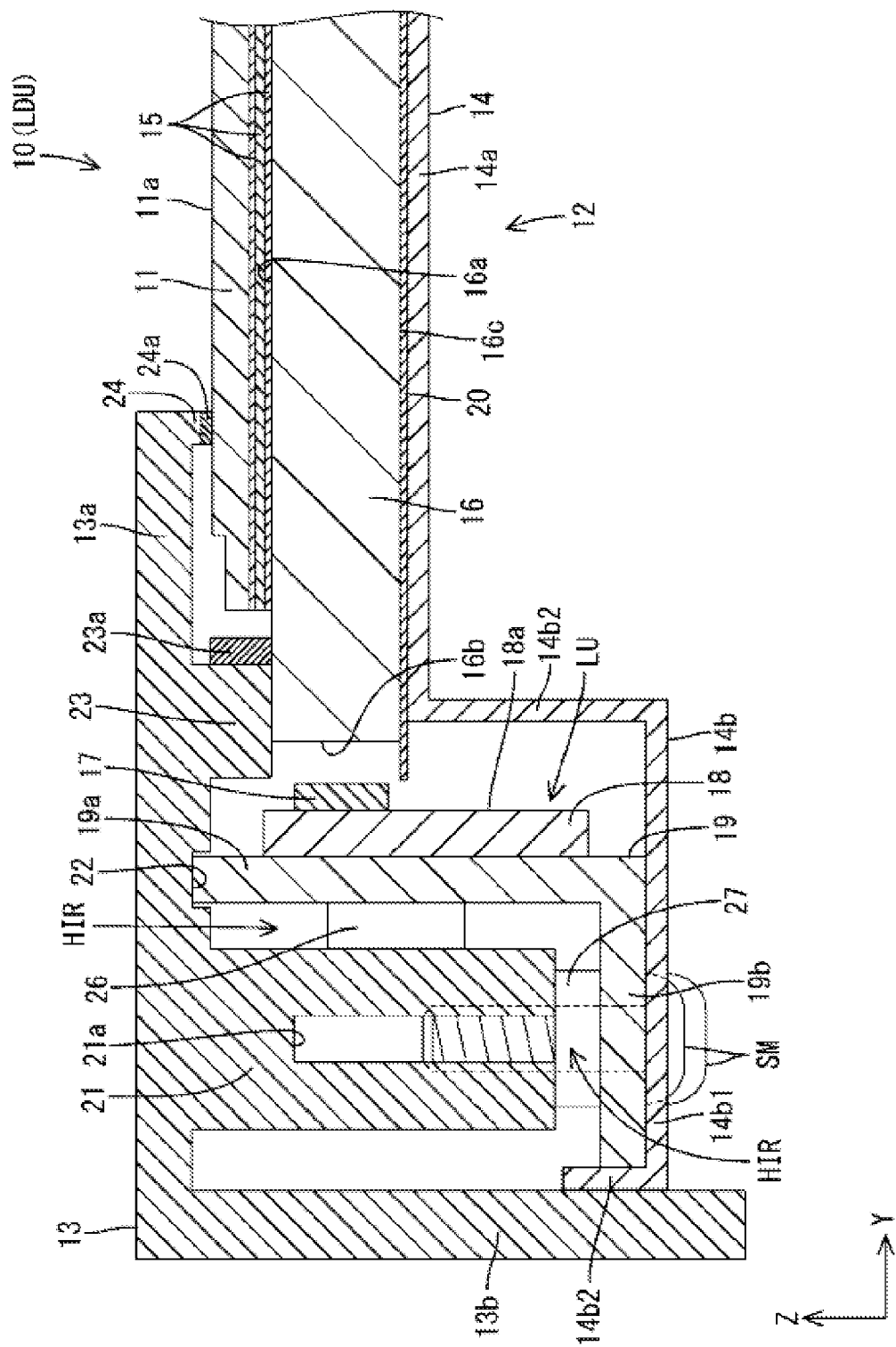
FIG. 8 is a cross-sectional view along the line viii-viii of FIG. 5.

As shown in FIGS. 5 and 6, gap restricting members 26 and 27 are provided between the heat dissipating member 19 and the protruding member 21 to restrict a gap between the two so as to form an air space therebetween as the heat insulating layer HIR. The gap restricting members 26 and 27 are integrally formed with the heat dissipating member 19. The gap restricting members 26 and 27 are formed as protrusions that are formed by making portions of the heat dissipating member 19 protrude toward the protruding member 21, and take the form of dots in a plan view. A plurality of gap restricting members 26 and 27 are arranged at intervals along the longer side direction of the heat dissipating member 19, or in other words, along the direction in which the LEDs 17 are arranged. Therefore, as shown in FIG. 8, between respective gap restricting members 26 (27) adjacent to each other in the X axis direction, the heat insulating layer HIR (air space) is formed.

As shown in FIGS. 5 and 6, the gap restricting members 26 and 27 are integrally formed with the LED attachment section 19a and the heat dissipating section 19b of the heat dissipating member 19, respectively. The gap restricting members 26 of the LED attachment section 19a each take the form of a circular protrusion, and the end face of the circular protrusion makes contact with the surface of the protruding member 21 facing the LED attachment section 19a. The gap restricting members 27 of the heat dissipating section 19b are each provided at an edge of the insertion hole 25 and take the form of a donut-shaped (ring-shaped) protrusion that extends along the hole edge. The end face of the donut-shaped protrusion makes contact with the surface of the protruding member 21 facing the heat dissipating section 19b. The gap restricting members 26 of the LED attachment section 19a and the gap restricting members 27 of the heat dissipating section 19b have substantially the same arrangement pitch in the X axis direction, and are disposed at substantially the same positions with respect to the X axis direction. These gap restricting members 26 and 27 are formed at the same time as punching the heat dissipating member 19 out of the base material, or are formed by hammering the heat dissipating member 19 that was punched out from the base material in the manufacturing process of the heat dissipating member 19.

The present embodiment has the above-mentioned structure, and the operation thereof will be explained next. The liquid crystal display device 10 is manufactured by assembling respective constituting components that are manufactured separately (frame 13, chassis 14, liquid crystal panel 11, optical members 15, light guide plate 16, LED units LU, and the like) together. In the assembly process, the respective constituting components are assembled after being flipped over with respect to the Z axis direction from the position shown in FIGS. 4 and 6. First, as shown in FIG. 9, the frame 13 among the constituting components is set on a not-shown work table such that the rear side thereof faces up in the vertical direction.

On the frame 13 that has been set with the orientation described above, as shown in FIG. 9, the liquid crystal panel 11 is placed with the CF substrate down and the array substrate up in the vertical direction. The front surface of the liquid crystal panel 11 is received by the buffer members 24a attached to the pressing protrusions 24 of the frame 13, and the end faces thereof are received by the buffer member 23a attached to the light-shielding supporting portion 23 in the frame 13, respectively, thereby absorbing shock and positioning the liquid crystal panel 11 with respect to the X axis direction and Y axis direction. Next, the respective optical members 15 are directly stacked on the rear side of the liquid crystal panel 11 in an appropriate order. Thereafter, the light guide plate 16 having the light guide reflective sheet 20 attached thereto is directly stacked on the rear side of the rearmost part of the optical members 15. The respective longer side edges of the light guide plate 16 are supported by the light-shielding supporting portions 23 of the frame 13, respectively.

Figure 9:
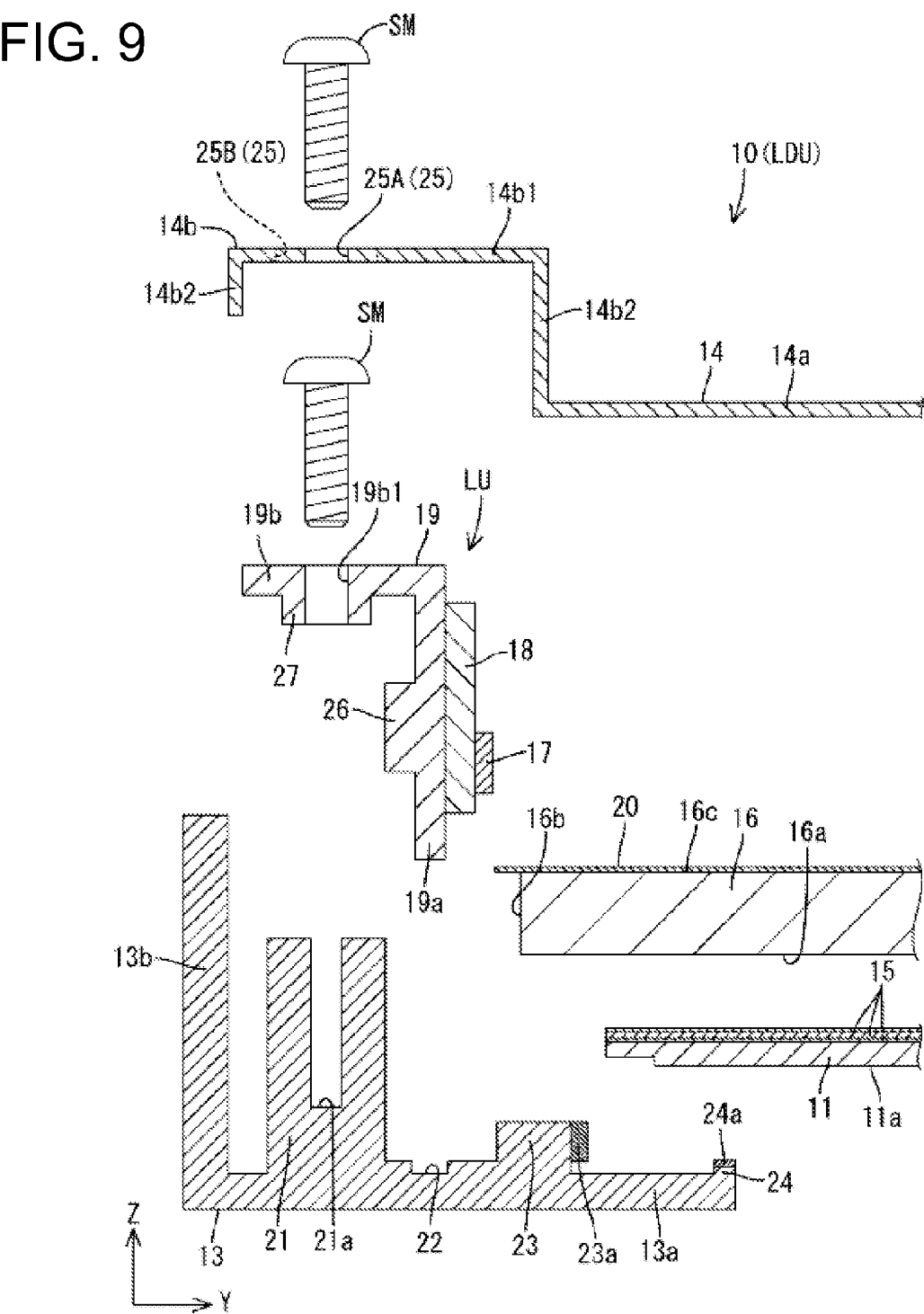
FIG. 9 is a cross-sectional view along the line vi-vi of FIG. 5, showing a work procedure to assemble respective constituting members of the liquid crystal display unit that constitutes a part of the liquid crystal display device.

On the other hand, as shown in FIG. 9, the LED units LU having the LEDs 17, the LED substrates 18, and the heat dissipating members 19 assembled together in advance are attached to the frame 13. The LED units LU are respectively attached to the protruding members 21 of the frame 13 such that the LEDs 17 are oriented toward the center (inner side) of the frame 13, and such that the gap restricting members 27 of the heat dissipating section 19b of the heat dissipating member 19 face the protruding members 21 of the frame 13. When the LED units LU are attached to the protruding members 21, the respective gap restricting members 26 and 27 of the heat dissipating members 19 make contact with the protruding members 21, and prescribed gaps are maintained between the LED attachment section 19a of the heat dissipating member 19 and the protruding member 21, and between the heat dissipating section 19b and the protruding member 21, respectively, thereby ensuring that an air space is formed as the heat insulating layer HIR. In this attachment process, by the front end of the LED attachment section 19a of each heat dissipating member 19 engaging the positioning portion 22 that takes the form of a groove, the LED unit LU is positioned with respect to the frame 13 in the Y axis direction. Also, in this state, the LED units LU are positioned such that respective insertion holes 19b1 of the heat dissipating sections 19b are connected to the grooves 21a of the protruding members 21, respectively.

After attaching the LED units LU to the protruding members 21 in the above-mentioned manner, screws SM are inserted into corresponding insertion holes 19b1 of the heat dissipating sections 19b, and then screwed into the grooves 21a of the protruding members 21. With the screws SM, the LED units LU are affixed to the protruding members 21 in the stage before the chassis 14 is attached in a manner described below (see FIG. 7). It is preferable that the LED units LU be attached to the frame 13 before the light guide plate 16 is attached, and in such a case, the LED units LU may be attached before the optical members 15 or the liquid crystal panel 11.

After attaching the liquid crystal panel 11, the optical member 15, the light guide plate, and the LED units LU to the frame 13 as described above, a process to attach the chassis 14 is conducted. As shown in FIG. 9, the chassis 14 is attached to the frame 13 with the front side thereof down in the vertical direction. At this time, by having the respective outer housing portion side walls 14b2 of the respective LED housing portions 14b of the chassis 14 make contact with the inner surfaces of the side walls 13b on the respective longer sides of the frame 13, the chassis 14 can be positioned with respect to the frame 13. In the assembly process, heads of the screws SM that are installed in the heat dissipating members 19 and the protruding members 21 are inserted into the respective heat dissipating member insertion holes 25B in the respective LED housing portions 14b of the chassis 14 (see FIG. 7). Then, when the bottom plate 14a of the chassis 14 makes contact with the light guide plate 16 (light guide reflective sheet 20) and the housing portion bottom plates 14b1 of the respective LED housing portions 14b make contact with the heat dissipating sections 19b of the respective heat dissipating members 19, screws SM are inserted into the insertion holes 25A for jointly fastening a plurality of parts, and the screws SM are screwed into the grooves 21a of the protruding members 21. With the screws SM, the LED units LU and the chassis 14 are affixed to the protruding members 21 (see FIG. 6).

The assembly of the liquid crystal display unit LDU is completed in the manner described above. Next, after the stand attachment member STA and various boards PWB, MB, and CTB are attached to the rear side of the liquid crystal display unit LDU, the stand ST and the cover member CV are attached to the rear side, thereby completing the liquid crystal display device 10 and the television receiver TV. In the liquid crystal display device 10 manufactured in this manner, the exterior thereof is constituted of the frame 13 that presses the liquid crystal panel 11 from the display surface 11a side, and the chassis 14 of the backlight device 12, and the liquid crystal panel 11 is directly stacked on the optical members 15. Therefore, as compared with a conventional configuration in which a cabinet made of a synthetic resin is provided in addition to the frame 13 and the chassis 14, or in which a supporting member is provided between the liquid crystal panel 11 and the optical members 15 so as to keep the two from making contact with each other, the number of parts and the assembly man-hour can be reduced, resulting in a lower manufacturing cost, and the size and weight reduction.

As shown in FIG. 4, when the liquid crystal display device 10 manufactured as described above is turned on, power is supplied from the power supply board PWB, causing various signals to be sent from the control board CTB to the liquid crystal panel 11, thereby controlling the drive thereof, and causing the respective LEDs 17 of the backlight device 12 to be driven. By passing through the optical members 15 after being guided by the light guide plate 16, light from the respective LEDs 17 is converted to even planar light, which then illuminates the liquid crystal panel 11, and a prescribed image is displayed on the liquid crystal panel 11. To explain the operation of the backlight device 12 in detail, when the respective LEDs 17 are lit, light emitted from the respective LEDs 17 enters the light-receiving surfaces 16b of the light guide plate 16 as shown in FIG. 6. In the process of travelling through the light guide plate 16 while being subject to the total reflection at the interfaces between the light guide plate 16 and external air spaces, being reflected by the light guide reflective sheet 20, and the like, the light that entered the light-receiving surfaces 16b is reflected or diffused by not-shown reflective portions and diffusion portions, thereby being outputted from the light output surface 16a and being radiated to the optical members 15.

When the respective LEDs 17 are lit in order to use the liquid crystal display device 10, heat is generated from the respective LEDs 17. As shown in FIGS. 6 and 8, heat generated from the respective LEDs 17 is first transferred to the LED substrates 18, and then transferred to the heat dissipating members 19. Because the heat dissipating members 19 are attached to the protruding members 21 of the frame 13 and the housing portion bottom plate 14b1 of the LED housing portions 14b of the chassis 14, heat from the LEDs 17 would be transferred from the heat dissipating members 19 to those members. In this embodiment, however, the heat dissipating member 19 is attached to the protruding member 21 so as to have an air space, which is the heat insulating layer HIR, therebetween, by having the gap restricting members 26, 27 that restrict the gap between the heat dissipating member 19 and the protruding member 21. In other words, the heat dissipating member 19 makes direct contact with the protruding member 21 only at the respective gap restricting members 26, 27 that protrude therefrom, and a large part of the surface thereof facing the protruding member 21 does not make direct contact with the protruding member 21 because of the heat insulating layer HIR interposed between the heat dissipating member 19 and the protruding member 21. Therefore, heat transferred from the LEDs 17 to the heat dissipating members 19 is not transferred to the protruding members 21 almost at all. On the other hand, almost the entire heat dissipating sections 19b of the heat dissipating members 19 make surface-to-surface contact with the housing portion bottom plates 14b in the LED housing portions 14b of the chassis 14. Therefore, the heat transferred from the LEDs 17 to the heat dissipating members 19 is efficiently transferred to the chassis 14, and is efficiently dissipated to the outside from the chassis 14, making it difficult for the liquid crystal display device 10 to trap the heat therein.

The frame 13 having the protruding members 21 integrally formed therewith constitutes the front exterior of the liquid crystal display device 10, or in other words, the exterior on the side that faces viewers, and as compared to the chassis 14 that constitutes the rear exterior, an external object can touch the frame 13 more easily. In the present embodiment, heat generated from the LEDs 17 is less likely to be transferred to the protruding members 21 as a result of the heat insulating layer HIR as described above, and the frame 13 is less susceptible to temperature increase caused by the heat from the LEDs 17, and the temperature thereof is kept low. Therefore, even if an external object touches the frame 13, it is possible to effectively prevent the object from being adversely affected by the heat. In particular, the frame 13 of the present embodiment is made of a metal in order to ensure adequate mechanical strength, and has excellent heat conductivity. Therefore, by blocking heat transfer from the LEDs 17 with the heat insulating layers HIR, the temperature increase is effectively suppressed. On the other hand, the chassis 14 constitutes the rear exterior of the liquid crystal display device 10, or in other words, the exterior on the side opposite to the viewer's side, and therefore, is less likely to be touched by an external object as compared with the frame 13 that constitutes the front exterior. Therefore, even though the chassis 14 is more susceptible to the temperature increase caused by the heat from the LEDs 17 by the above-mentioned configuration in which the heat dissipating sections 19b of the heat dissipating members 19 make surface-to-surface contact with the surfaces of the chassis 14, because the chassis 14 is less likely to be touched by an external object, the temperature increase is not likely to cause a problem. The chassis 14 of the present embodiment is made of a metal in order to ensure adequate mechanical strength and has excellent heat conductivity, and therefore, heat from the LEDs 17 can be efficiently dissipated, resulting in high heat dissipating performance.

As described above, the liquid crystal display device (display device) 10 of the present embodiment includes: the LEDs (light source) 17; the heat dissipating members (light source attachment members) 19 to which the LEDs 17 are attached; the liquid crystal panel (display panel) 11 that conducts display by using light from the LEDs 17; the light guide plate 16 disposed on the side of the liquid crystal panel 11 opposite to the display surface 11a such that end faces thereof face the LEDs 17; the chassis 14 disposed on the side of the light guide plate 16 opposite to the liquid crystal panel 11; the frame (exterior member) 13 disposed on the display surface 11a of the liquid crystal panel 11, the frame 13 holding the liquid crystal panel 11 and the light guide plate 16 by sandwiching the two with the chassis 14 while housing the LEDs 17 and the heat dissipating members 19 therein, the frame 13 constituting the exterior of the liquid crystal display device 10; and protruding members 21 protruding from the frame 13 toward the heat dissipating members 19, the protruding members being provided to attach the heat dissipating members 19 to the frame 13, the protruding members having heat insulating layers HIR between the protruding members and the heat dissipating members 19.

With this configuration, light emitted from the LEDs 17 is guided to the liquid crystal panel 11 after entering the end faces of the liquid guide plate 16 facing the LEDs 17, and by using the light, an image is displayed on the liquid crystal panel 11. When the LEDs 17 are lit, heat is generated therefrom, and the heat is first transferred to the heat dissipating members 19 to which the LEDs 17 are attached, and then possibly transferred from the heat dissipating members 19 to the protruding members 21. The heat insulating layers HIR are, however, interposed between the heat dissipating members 19 and the protruding members 21, and therefore, it is possible to effectively mitigate the heat transfer from the heat dissipating members 19 to the protruding members 21. Because the protruding members 21 protrude from the frame 13 that is disposed on the display surface 11a side of the liquid crystal panel 11, by mitigating the heat transfer to the protruding members 21, it is possible to mitigate an increase in temperature of the frame 13 caused by the heat from the LEDs 17. The frame 13 is disposed on the display surface 11a side of the liquid crystal panel 11 and constitutes the exterior, and therefore, the frame 13 is exposed to the outside. Although this makes it easier for an external object to touch the frame 13, because the increase in temperature thereof is mitigated as described above, it is possible to effectively prevent an external object from being adversely affected by heat even when the external object touches the frame 13.

The heat dissipating member 19 has the heat dissipating section 19b that extends along the surface of the chassis 14 and that makes surface-to-surface contact with the surface of the chassis 14. With this configuration, heat is efficiently transferred from the heat dissipating section 19b of the heat dissipating member 19 to the chassis 14, and therefore, heat is less likely to be trapped in the liquid crystal display device 10. The chassis 14 is attached to the light guide plate 16 on the side opposite to the liquid crystal panel 11, and therefore, even if the chassis 14 is exposed to the outside, an external object is less likely to touch the chassis 14 as compared with the frame 13 that is disposed on the display surface 11a. Therefore, an increase in temperature of the chassis due to heat from the LEDs 17 is not likely to be a problem.

The heat dissipating section 19b is interposed between the protruding members 21 and the chassis 14, and a heat insulating layer HIR is interposed between the heat dissipating section 19b and the protruding member 21. With this configuration, heat transfer from the heat dissipating section 19b to the protruding member 21 is mitigated, and as a result, it is possible to further mitigate an increase in temperature of the frame 13.

The heat dissipating member 19 also has the LED attachment section 19a that is disposed between the light guide plate 16 and the protruding member 21 and that has the LEDs 17 attached thereto, and the heat insulating layer HIR is interposed between the LED attachment section 19a and the protruding member 21. With this configuration, heat transfer from the LED attachment section 19a to the protruding member 21 is mitigated, and as a result, it is possible to further mitigate an increase in temperature of the frame 13.

The frame 13 has a positioning portion 22 that can position the heat dissipating member 19 with respect to the light guide plate 16 by engaging the end portion of the LED attachment section 19a. With this configuration, the heat dissipating member 19 is positioned with respect to the light guide plate 16 by the positioning portion 22, and therefore, it is possible to achieve a stable positional relationship between the LEDs 17 attached to the LED attachment section 19a and the end face of the light guide plate 16. As a result, the incident efficiency of light that enters the end face of the light guide plate 16 from the LEDs 17 can be made stable.

The frame 13 has at least the panel pressing portion 13a that lies parallel to the display surface 11a of the liquid crystal panel 11 and that presses the liquid crystal panel 11, and the protruding member 21 protrudes from the panel pressing portion 13a toward the chassis 14. With this configuration, even though the panel pressing portion 13a is more likely to be touched by an external object than any other portions of the frame 13 disposed on the display surface 13a side of the liquid crystal panel 11, heat transfer from the heat dissipating member 19 to the protruding member 21 is blocked by the heat insulating layer HIR, and therefore, it is possible to effectively mitigate an increase in temperature of the panel pressing portion 13a, which makes this configuration even more useful.

The frame 13 is provided with a light-shielding supporting portion (light-shielding portion) 23 interposed between the liquid crystal panel 11 and the LEDs 17. In this configuration, with the light-shielding supporting portion 23, it is possible to prevent light from the LEDs 17 from directly entering the liquid crystal panel 11 without passing through the light guide plate 16. This results in excellent display quality.

The frame 13 is provided with the light-shielding supporting portion (supporting portion) 23 that supports the surface of the light guide plate 16 facing the liquid crystal panel 11. With this configuration, the light guide plate 16 can be supported by the light-shielding supporting portion 23 from the side facing the liquid crystal panel 11. Therefore, it is possible to achieve a stable positional relationship between the LEDs 17 and the light guide plate 16. As a result, the incident efficiency of light that enters the end face of the light guide plate 16 from the LEDs 17 can be made stable.

The screws (holding members) SM that are attached to the protruding members 21 and that can affix the heat dissipating member 19 and the chassis 14 altogether by having the two components between the screws and the protruding members 21 are provided. In this configuration, by using the screws SM, it is possible to collectively fasten the heat dissipating member 19 and the chassis 14 to the frame 13. The protruding members 21 act as the attachment structure for the heat dissipating members 19, and also act as the attachment structure for the chassis 14, and therefore, this configuration is useful to achieve a simpler structure.

The gap restricting members 26 and 27 are provided between the heat dissipating member 19 and the protruding member 21 to restrict a gap therebetween while having an air space interposed as the heat insulating layer HIR. In this configuration, by restricting the gap between the heat dissipating member 19 and the protruding member 21 by the gap restricting members 26 and 27, it is possible to secure an air space of a prescribed size between the two as the heat insulating layer HIR, and as a result, the heat insulating property can be reliably achieved.

A plurality of the gap restricting members 26 and 27 are arranged at intervals. With this configuration, as compared with a configuration in which the gap restricting member extends along the heat dissipating member 19 and the protruding member 21, the contact areas of the gap restricting members 26 and 27 with the heat dissipating member 19 and the protruding member 21 become smaller, and an air space is formed between respective adjacent gap restricting members 26 and 27. As a result, a greater heat insulating property can be achieved.

The protruding members 21 are integrally formed with the frame 13. With this configuration, it is possible to reduce the number of parts and to make the assembly process easier as compared with the case in which the protruding members are provided as separate parts. Although heat can be transmitted from the protruding members 21 to the frame 13 more easily as compared with the case in which the protruding members and the frame are separate parts, which possibly increases the temperature of the frame 13, because the heat insulating layer HIR is interposed between the protruding member 21 and the heat dissipating member 19, heat transfer from the LEDs 17 to the frame 13 is mitigated. As a result, an increase in temperature of the frame 13 is effectively mitigated.

The frame 13 is made of a metal. Because the rigidity of the frame 13 can be improved, this configuration is useful when the liquid crystal display device 10 is made larger. When the frame 13 is made of a metal, the heat conductivity becomes higher than a frame made of a synthetic resin. However, by providing the heat insulating layer HIR between the protruding member 21 and the heat dissipating member 19, heat from the LEDs 17 is less likely to be transferred to the frame 13, and the temperature increase is effectively mitigated.

Embodiment 1 of the present invention has been described above, but the present invention is not limited to the embodiment above, and may include modification examples below, for example. In the modification examples below, components similar to those in the embodiment above are given the same reference characters, and descriptions and depictions thereof may be omitted.

Modification Example 1 of Embodiment 1

Modification Example 1 of Embodiment 1 will be described with reference to FIG. 10. In this example, the shape of the gap restricting members 26-1 and 27-1 is modified.

Figure 10:
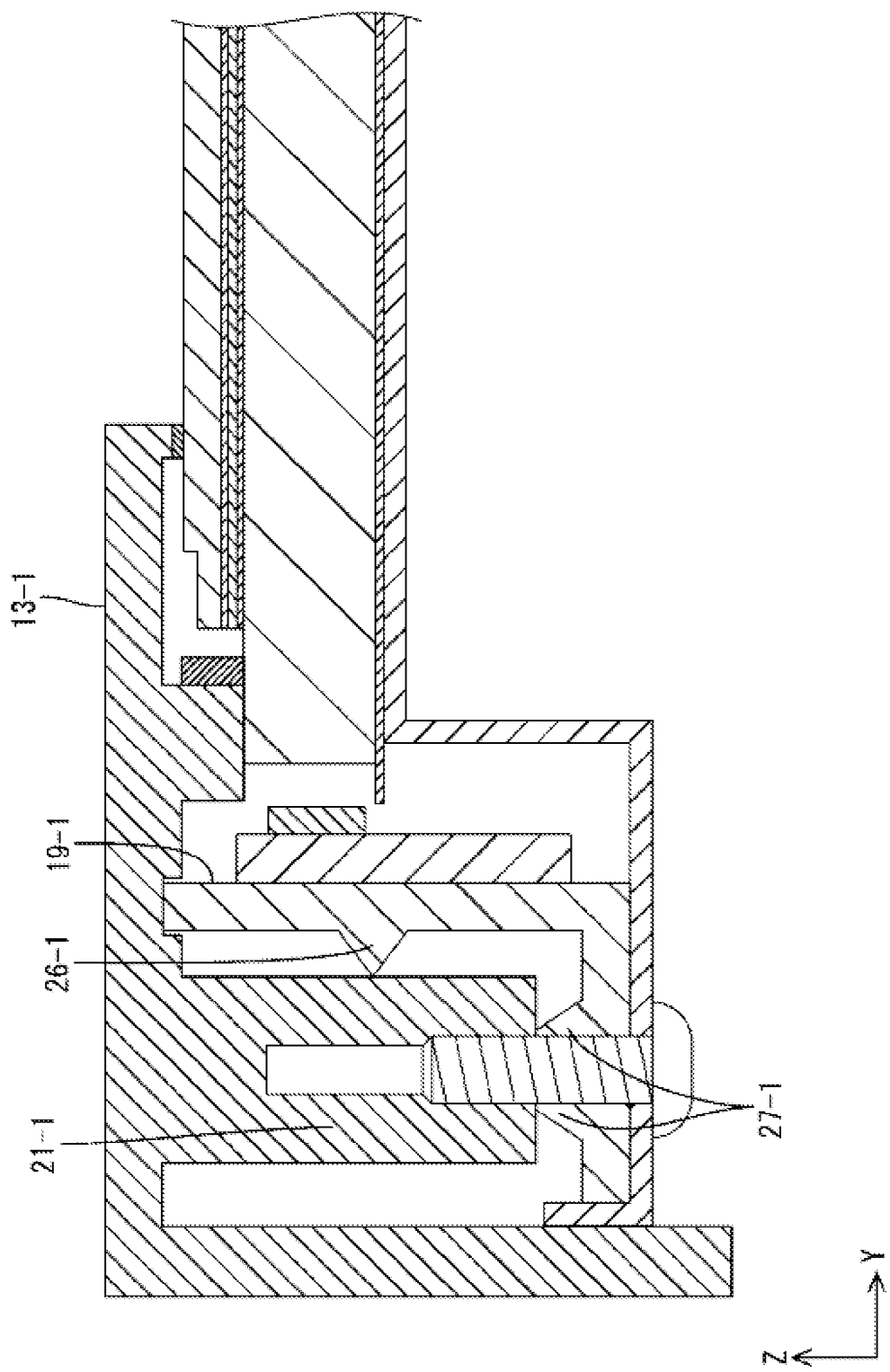
FIG. 10 is a cross-sectional view showing a cross-sectional configuration of a gap restricting member of Modification Example 1 of Embodiment 1.

As shown in FIG. 10, the gap restricting members 26-1 and 27-1 of this modification example are configured to make point-contact with the protruding member 21-1 in a side view. The gap restricting members 26-1 and 27-1 have a substantially triangular cross-section, and the respective tips thereof make contact with the protruding member 21-1. With this configuration, the contact area where the heat dissipating member 19-1 makes contact with the protruding member 21-1 is reduced as compared with Embodiment 1 above, and therefore, heat transfer from the gap restricting members 26-1 and 27-1 to the protruding member 21-1 is further mitigated. As a result, it is possible to mitigate an increase in temperature of the frame 13-1 even more.

Modification Example 2 of Embodiment 1

Modification Example 2 of Embodiment 1 will be described with reference to FIG. 11. In this example, the arrangement and number of the gap restricting members 26-2 and 27-2 are modified.

Figure 11:
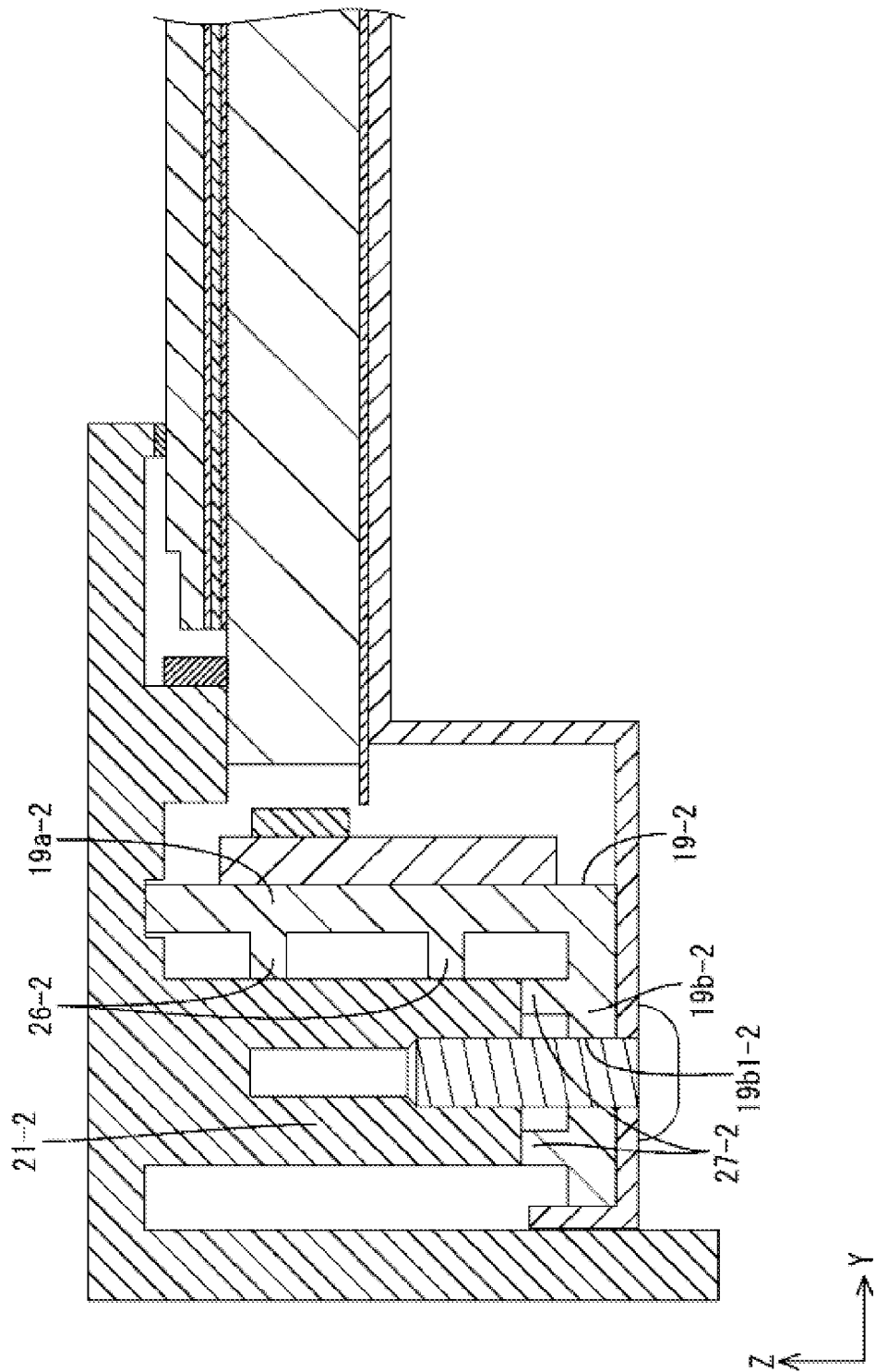
FIG. 11 is a cross-sectional view showing a cross-sectional configuration of a gap restricting member of Modification Example 2 of Embodiment 1.

As shown in FIG. 11, in this modification example, a pair of gap restricting portions 26-2 and a pair of gap restricting portions 27-2 are respectively provided in the LED attachment section 19a-2 and the heat dissipating section 19b-2 that constitute the heat dissipating member 19-2. The pair of gap restricting members 26-2 disposed on the LED attachment section 19a-2 is provided at positions on the LED attachment section 19a-2 that are separated from each other along the Z axis direction. Similarly, the pair of gap restricting members 27-2 disposed on the heat-dissipating section 19b-2 is provided at positions on the heat dissipating section 19b-2 that are separated from each other along the Y axis direction. In particular, this example differs from Embodiment 1 in that the gap restricting members 27-2 formed on the heat dissipating section 19b-2 are provided at positions that are not on the edge of the insertion hole 19b1-2. With this configuration, it is possible to stably attach the heat dissipating member 19-2 to the protruding member 21-2.

Modification Example 3 of Embodiment 1

Modification Example 3 of Embodiment 1 will be described with reference to FIG. 12. In this example, the shape of the protruding member 21-3 is modified.

Figure 12:
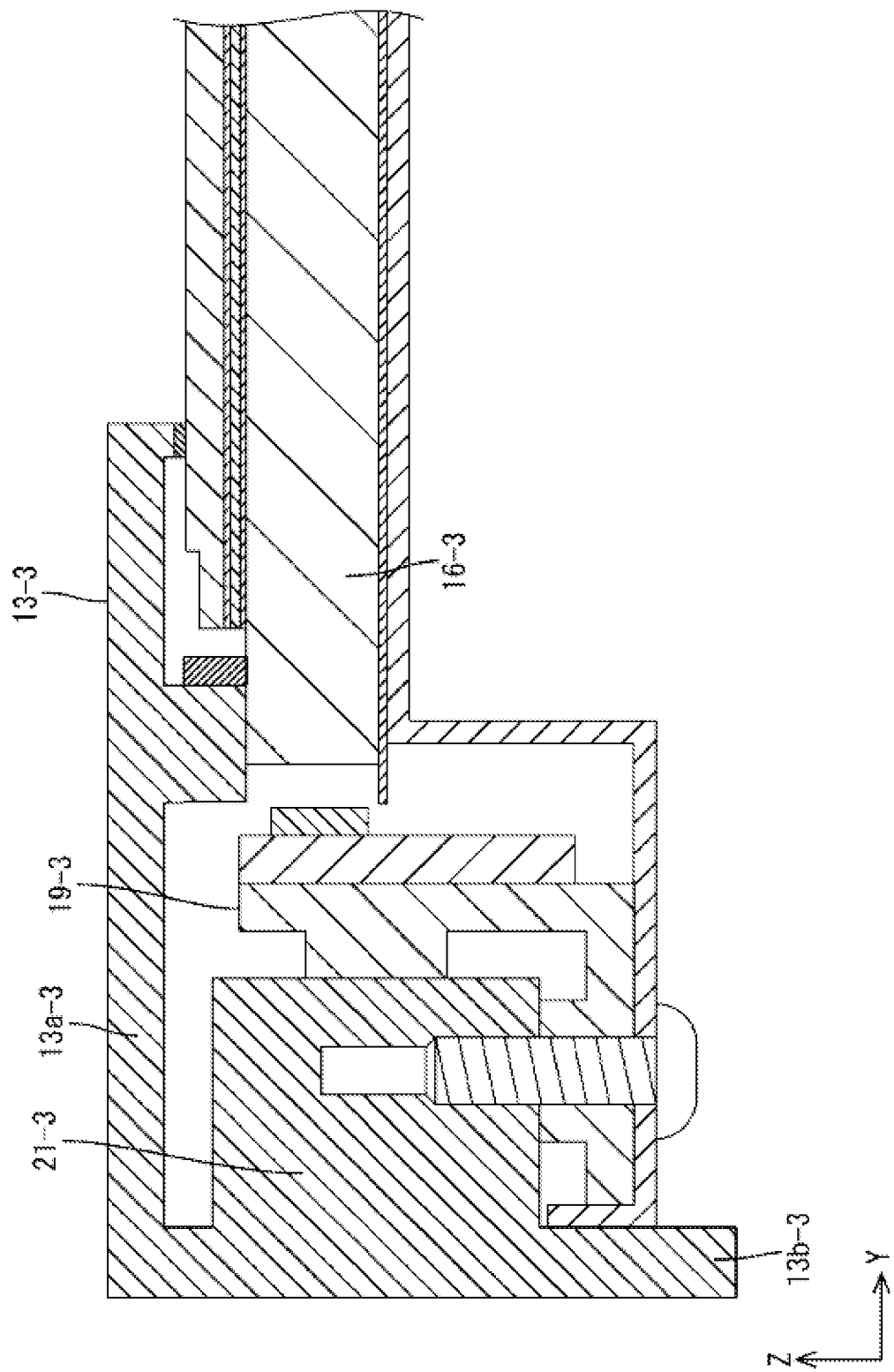
FIG. 12 is a cross-sectional view showing a cross-sectional configuration of a protruding member of Modification Example 3 of Embodiment 1.

As shown in FIG. 12, the protruding member 21-3 of this modification example is continued to the side wall 13b-3 of the frame 13-3, and is separated from the panel pressing portion 13a-3. The protruding member 21-3 is configured to protrude from the inner wall surface of the side wall 13b-3 toward the inside, or toward the heat dissipating member 19-3 (light guide plate 16-3).

Modification Example 4 of Embodiment 1

Modification Example 4 of Embodiment 1 will be described with reference to FIG. 13. In this example, the shape of the protruding member 21-4 is modified differently.

Figure 13:
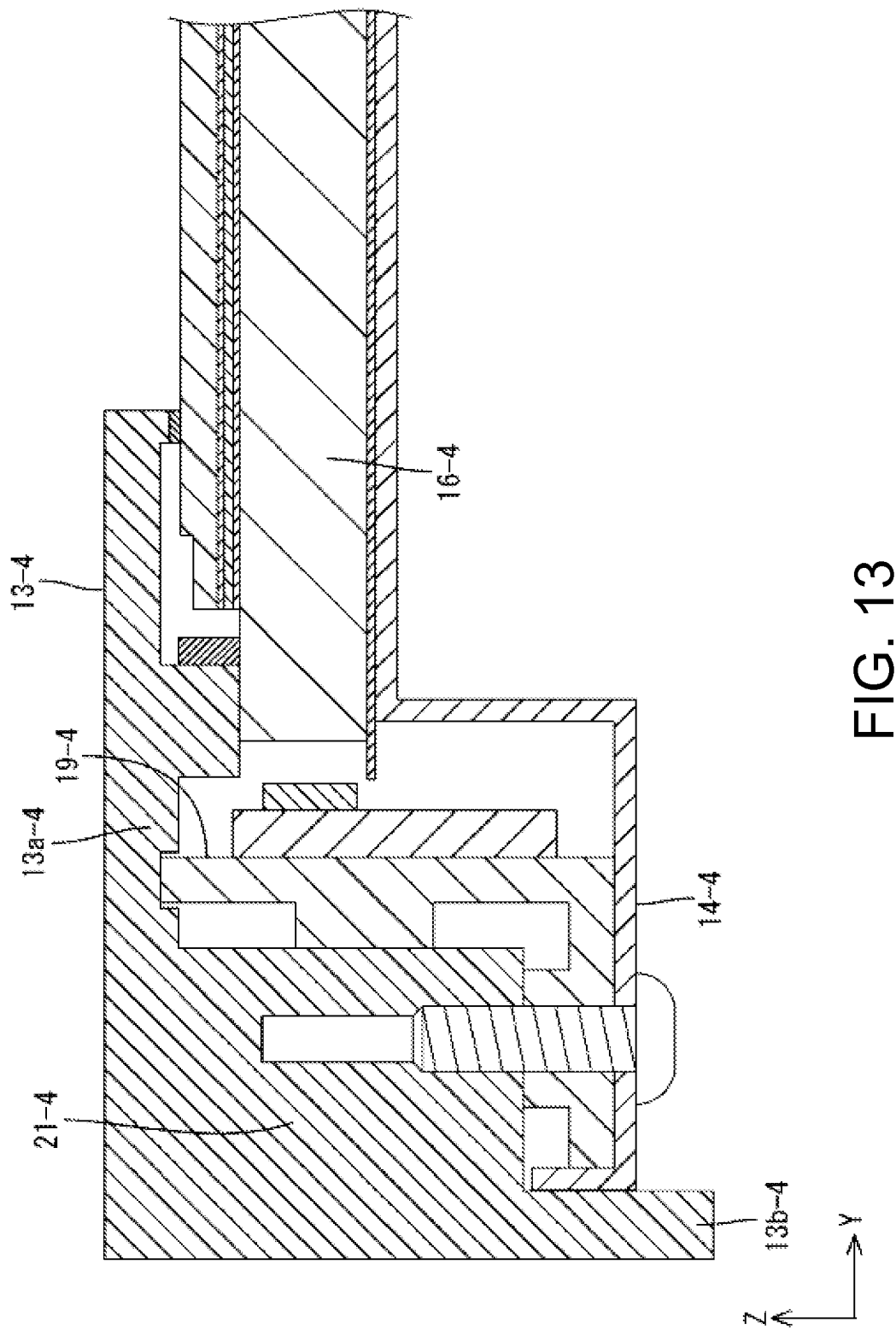
FIG. 13 is a cross-sectional view showing a cross-sectional configuration of a protruding member of Modification Example 4 of Embodiment 1.

As shown in FIG. 13, the protruding member 21-4 of this modification example is continued to both the panel pressing portion 13a-4 and the side wall 13b-4 of the frame 13-4. The protruding member 21-4 protrudes from the inner wall surface of the panel pressing portion 13a-4 toward the rear side, or toward the heat dissipating member 19-4 (chassis 14-4), and also protrudes from the inner wall surface of the side wall 13b-4 toward the inside, or toward the heat dissipating member 19-4 (light guide plate 16-4).

Embodiment 2

Embodiment 2 of the present invention will be described with reference to FIGS. 14 and 15. In Embodiment 2, gap restricting members 126 and 127 are integrally formed with a protruding member 121. Descriptions of structures, operations, and effects similar to those of Embodiment 1 will be omitted.

Figure 14:
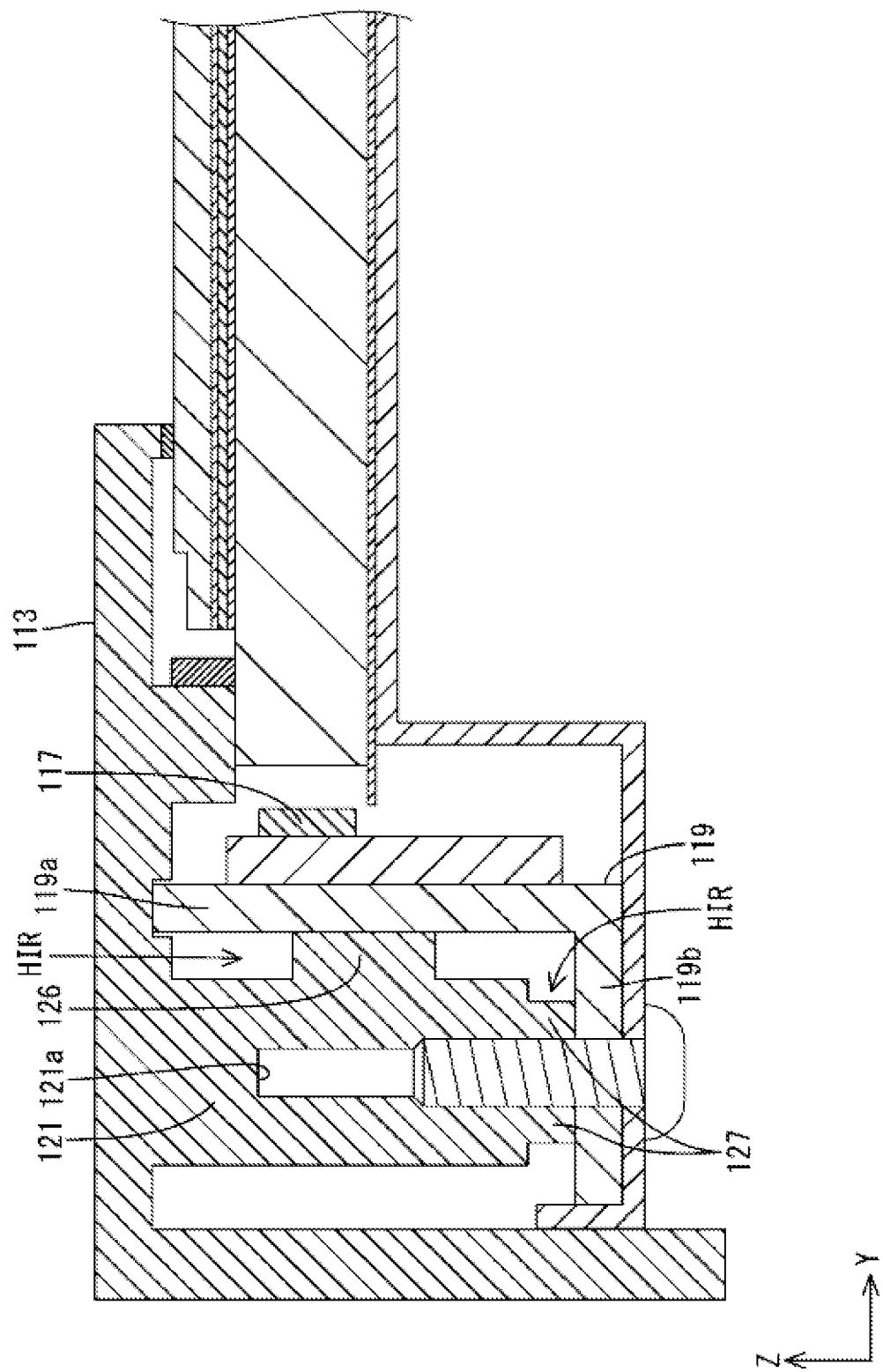
FIG. 14 is a cross-sectional view showing a cross-sectional configuration of a gap restricting member of Embodiment 2 of the present invention.
Figure 15:
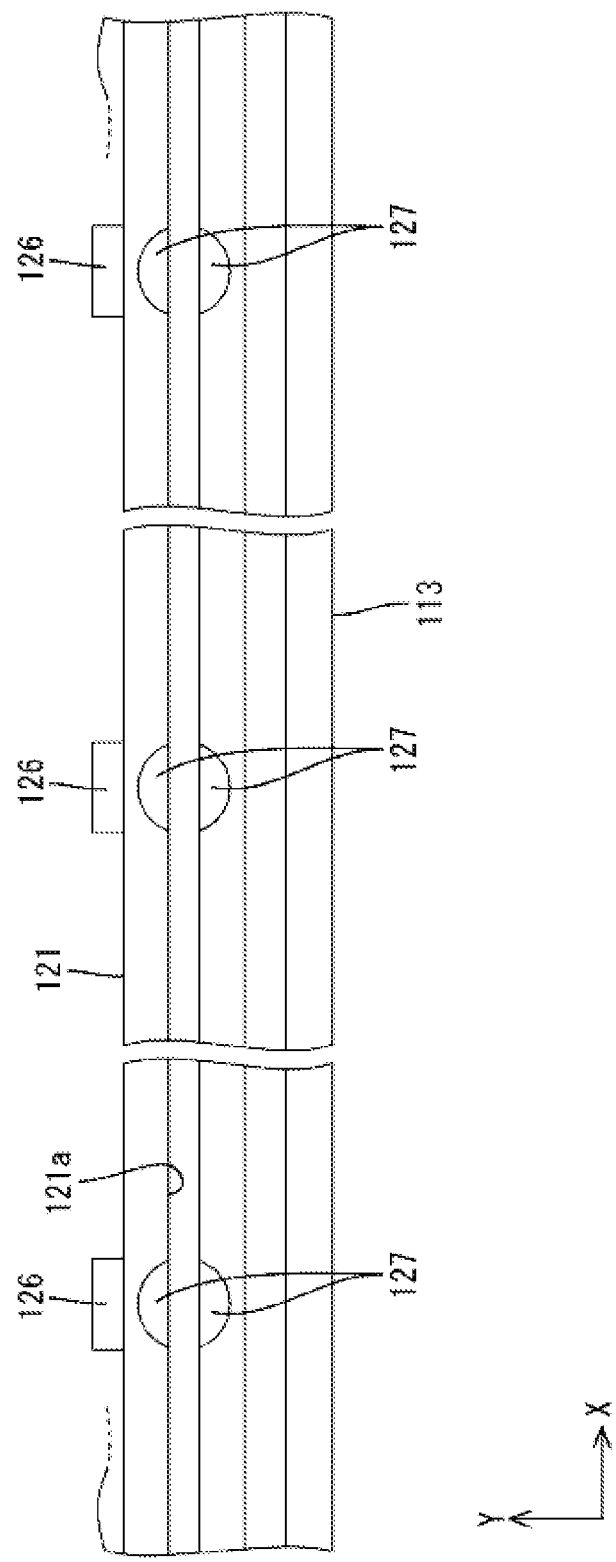
FIG. 15 is a bottom view of the protruding member having the gap restricting member.

As shown in FIGS. 14 and 15, the gap restricting members 126 and 127 of the present embodiment are integrally formed with the protruding member 121 of the frame 113. The gap restricting members 126 and 127 are formed by making portions of the surface of the protruding member 121 that faces the heat dissipating member 119 protrude toward the heat dissipating member 119, and are each formed in a dot shape in a plan view. A plurality of gap restricting members 126 and 127 are arranged at intervals along the longer side direction (X axis direction) of the protruding member 121. The gap restricting members 126 formed on the surface of the protruding member 121 that faces the LED attachment section 119a of the heat dissipating member 119 each take the form of a circular protrusion, and the circular end face of the protrusion makes contact with the surface of the LED attachment section 119a that faces the protruding member 121. Each pair of the gap restricting members 127, which is disposed on the surface of the protruding member 121 that faces the heat dissipating section 119b of the heat dissipating member 119, is formed at edges of a groove 121a that extends along the X axis direction so as to face each other over the groove. Each gap restricting member is a protrusion formed in an arc shape in a plan view (FIG. 15). The protrusion end faces of the gap restricting members 127 make contact with the surface of the heat dissipating section 119b that faces the protruding member 121. Even with such a configuration, the gap between the protruding member 121 and the heat dissipating member 119 is restricted by the gap restricting members 126 and 127 so as to form the heat insulating layer HIR interposed therebetween, and therefore, it becomes difficult for heat from the LEDs 117 to be transferred to the protruding member 121, and it is possible to appropriately mitigate an increase in temperature of the frame 113.

Embodiment 3

Embodiment 3 of the present invention will be described with reference to FIGS. 16 and 17. In Embodiment 3, heat insulating members 28 and 29 are provided instead of the gap restricting members 26, 27, 126 and 127 described in Embodiments 1 and 2 above. Descriptions of structures, operations, and effects similar to those of Embodiment 1 will be omitted.

Figure 16:
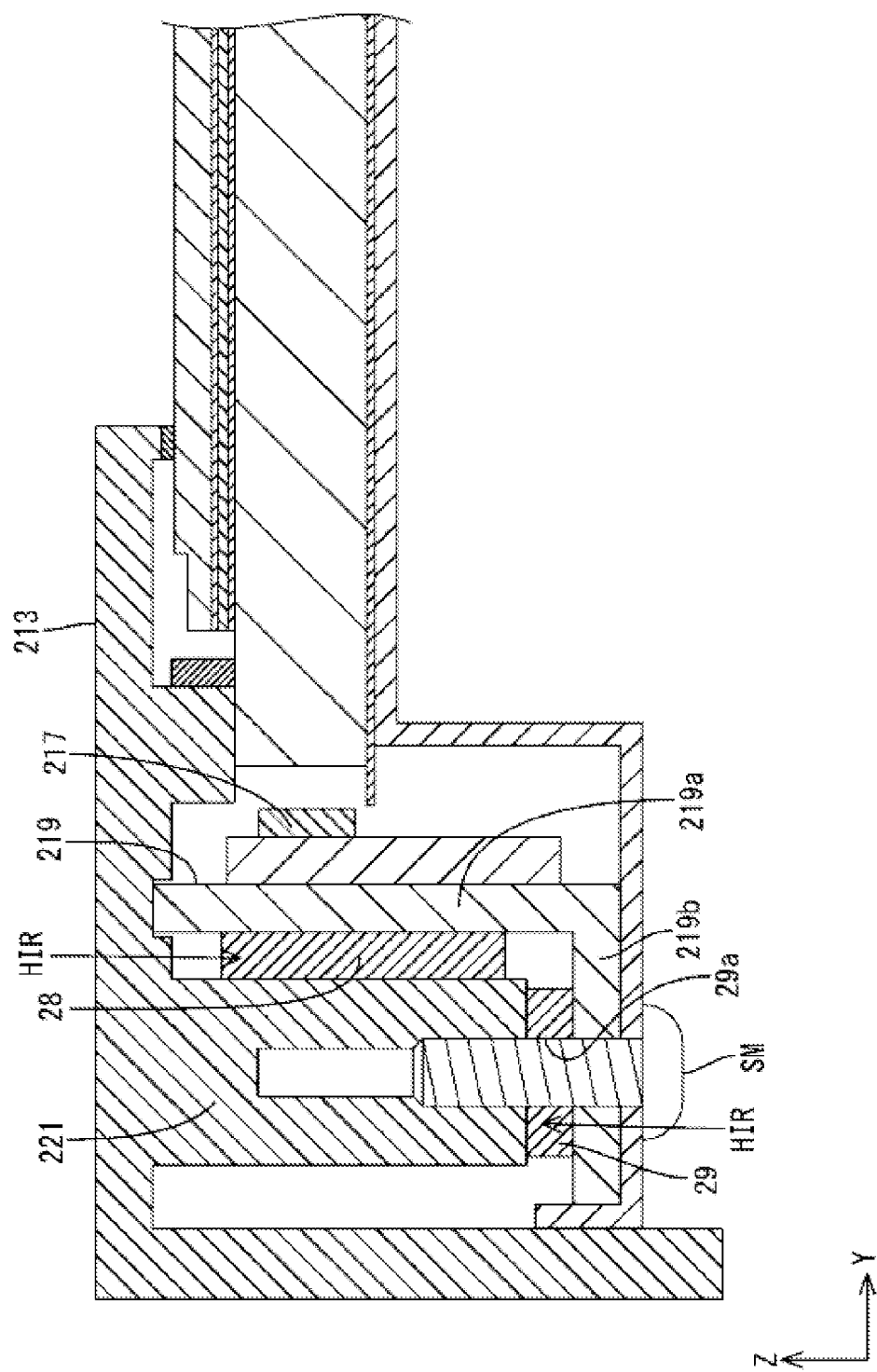
FIG. 16 is a cross-sectional view showing a cross-sectional configuration of a heat insulating member of Embodiment 3 of the present invention.
Figure 17:
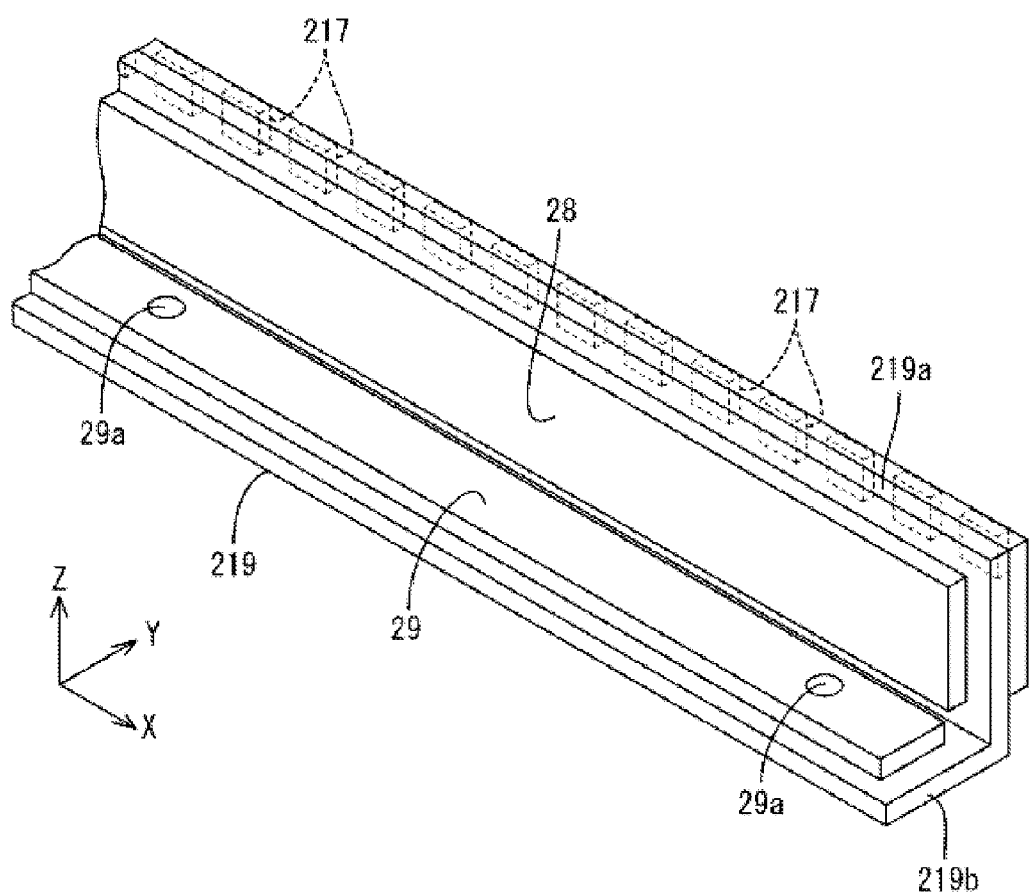
FIG. 17 is a perspective view showing a heat-dissipating member to which the heat insulating member is attached.

As shown in FIG. 16, between the protruding member 221 and the heat dissipating member 219 of the present embodiment, heat insulating members 28 and 29 having heat insulating layers HIR are interposed, respectively. The heat insulating members 28 and 29 are foam heat insulating members made of a foam resin material (such as foam PET and foam urethane), and by having numerous fine air bubbles (not shown) therein, excellent insulating property is achieved. The numerous air bubbles in the heat insulating members 28 and 29 constitute the heat insulating layers HIR. As shown in FIG. 17, the heat insulating members 28 and 29 are formed in a narrow sheet shape that extends along the longer side direction (X axis direction) of the protruding member 221 and the heat dissipating member 219, and make surface-to-surface contact with the protruding member 221 and the heat dissipating member 219. The heat insulating members 28 and 29 have a length that covers the substantially entire length of the protruding member 221 and the heat dissipating member 219. The heat insulating members 28 and 29 are entirely bonded to the heat dissipating member 219 by using a bonding material such as an adhesive or a double-sided tape. The heat insulating member 28 attached to the LED attachment section 219a of the heat dissipating member 219 abuts on the surface of the protruding member 221 that faces the LED attachment section 219a, thereby acting as a heat insulator therebetween. The heat insulating member 29 attached to the heat dissipating section 219b of the heat dissipating member 219 abuts on the surface of the protruding member 221 that faces the heat dissipating section 219b, thereby acting as a heat insulator therebetween. In the heat insulating member 29 between the protruding member 221 and the heat dissipating section 219b of the heat dissipating member 219, an insertion hole 29a in which the screw SM is inserted is formed. By preventing the heat transfer between the protruding member 221 and the heat dissipating member 219 by the heat insulating members 28 and 29, the heat transfer from the LEDs 217 to the protruding member 221 is reduced, and as a result, an increase in temperature of the frame 213 can be appropriately mitigated.

As described above, in the present embodiment, the heat insulating members 28 and 29 that have the heat insulating layers HIR are interposed between the heat dissipating member 219 and the protruding member 221. This way, by using the heat insulating members 28 and 29 having the heat insulating layers HIR, the heat insulating effect can be improved as compared with the case in which the heat insulating layer HIR is an air space.

The heat insulating members 28 and 29 are foam heat insulators. This way, by using foam heat insulators as the heat insulating members 28 and 29, air convection is prevented from occurring in the heat insulating layers HIR, and therefore, it is possible to further improve the heat insulating effect.

Embodiment 4

Embodiment 4 of the present invention will be described with reference to FIG. 18. In Embodiment 4, the shape of a protruding member 321 and the like are modified. Descriptions of structures, operations, and effects similar to those of Embodiment 1 will be omitted.

Figure 18:
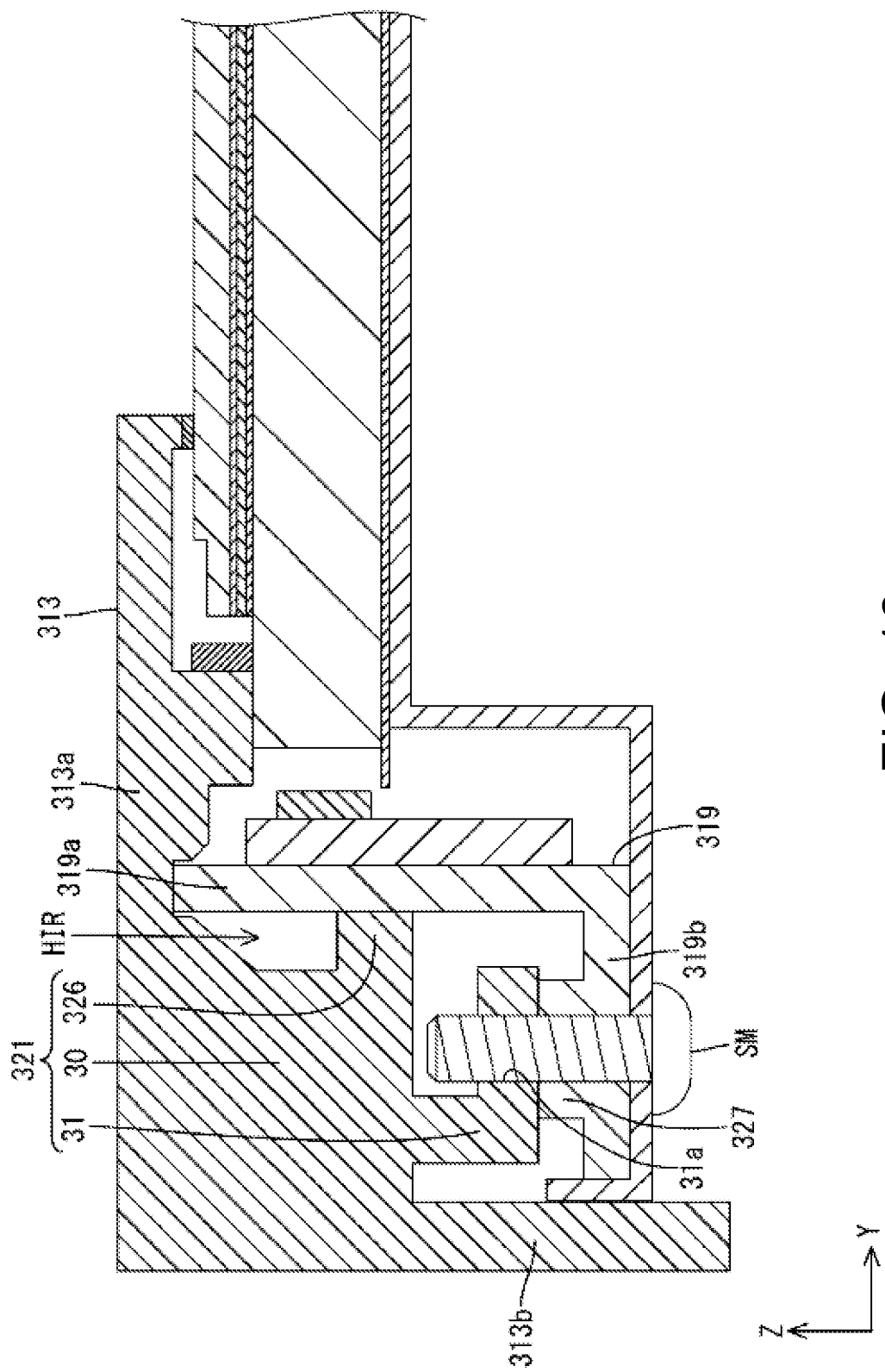
FIG. 18 is a cross-sectional view showing a cross-sectional configuration of a protruding member of Embodiment 4 of the present invention.

As shown in FIG. 18, the protruding member 321 of the present embodiment is constituted of a protrusion main body 30 that is continued to both of the panel pressing portion 313a and the side wall 313b of the frame 313, gap restricting members 326 that protrude from the protrusion main body 30 toward the LED attachment section 319a of the heat dissipating member 319, and a screw receiving portion (holding member receiving portion) 31 that protrudes from the protrusion main body 321a toward the heat dissipating section 319b. The protrusion main body 30 protrudes from the inner wall surface of the panel pressing portion 313a toward the rear side and from the inner wall surface of the side wall 313b toward the inside, respectively, and is formed in a narrow block shape that extends along the X axis direction. The gap restricting member 326 takes the form of a protrusion that protrudes from the surface of the protrusion main body 30 that faces the LED attachment section 319a, and the protrusion end face thereof abuts on the surface of the LED attachment section 319a, thereby restricting a gap between the protrusion main body 30 and the LED attachment section 319a. As a result, an air space is formed between the protrusion main body 30 and the LED attachment section 319a as the heat insulating layer HIR. The screw receiving portion 31 protrudes from the surface of the protrusion main body 30 that faces the heat dissipating section 319b toward the rear side, and then bends so as to lie on the surface of the heat dissipating section 319b (Y axis direction), thereby forming a substantially L-shaped cross section. In a part of the screw receiving portion 31 that is parallel to the heat dissipating section 319b, a screw hole 31a for the screw SM is formed. The gap restricting member 327 formed on the heat dissipating section 319b abuts on a part of the screw receiving portion 31 that is parallel to the heat dissipating section 319b. As described above, even when the gap restricting members 326 and 327 are integrally formed with the protruding member 321 and the heat dissipating member 319, respectively, heat transfer to the protruding member 321 can be appropriately prevented.

Embodiment 5

Embodiment 5 of the present invention will be described with reference to FIG. 19. In Embodiment 5, the shape of a protruding member 421 and the like are modified differently. Descriptions of structures, operations, and effects similar to those of Embodiment 1 will be omitted.

Figure 19:
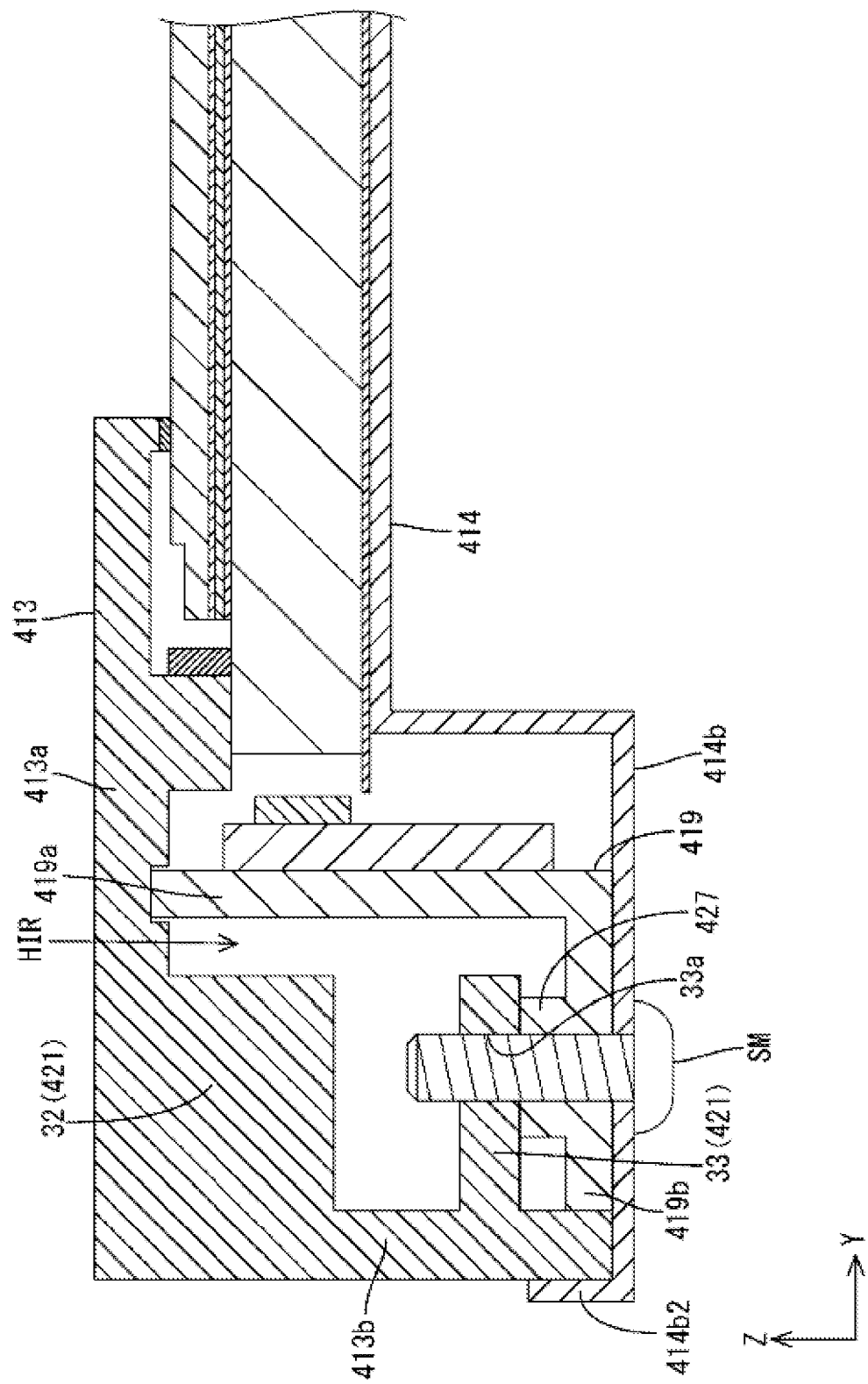
FIG. 19 is a cross-sectional view showing a cross-sectional configuration of a protruding member of Embodiment 5 of the present invention.

As shown in FIG. 19, the protruding member 421 of the present embodiment is divided into a first protruding member 32 that is continued to both the panel pressing portion 413a and side wall 413b of the frame 413, and a second protruding member 33 that protrudes from the side wall 413b toward the inside. The first protruding member 32 protrudes from the inner wall surface of the panel pressing portion 413a toward the rear side and from the inner wall surface of the side wall 413b toward the inside, respectively, and is formed in a narrow block shape that extends along the X axis direction. Between the first protruding member 32 and the LED attachment section 419a of the heat dissipating member 419, an air space is formed as the heat insulating layer HIR. The second protruding member 33 is formed in a plate shape that protrudes from a position on the inner wall surface of the side wall 413b, the position being away from the first protruding member 32 in the Z axis direction, toward the inside along the surface of the heat dissipating section 419b (Y axis direction). In the second protruding member 33, a screw hole 33a for a screw SM is formed. The gap restricting member 427 formed on the heat dissipating section 419b abuts on the second protruding member 33. The outer side wall 414b2 of the housing portion, which is a part of the LED housing portion 414b of the chassis 414, abuts on the outer wall surface of the side wall 413b of the frame 413.

Embodiment 6

Embodiment 6 of the present invention will be described with reference to FIG. 20. In Embodiment 6, a gap restricting member 34 is provided separately from a protruding member 521 and a heat dissipating member 519. Descriptions of structures, operations, and effects similar to those of Embodiment 1 will be omitted.

Figure 20:
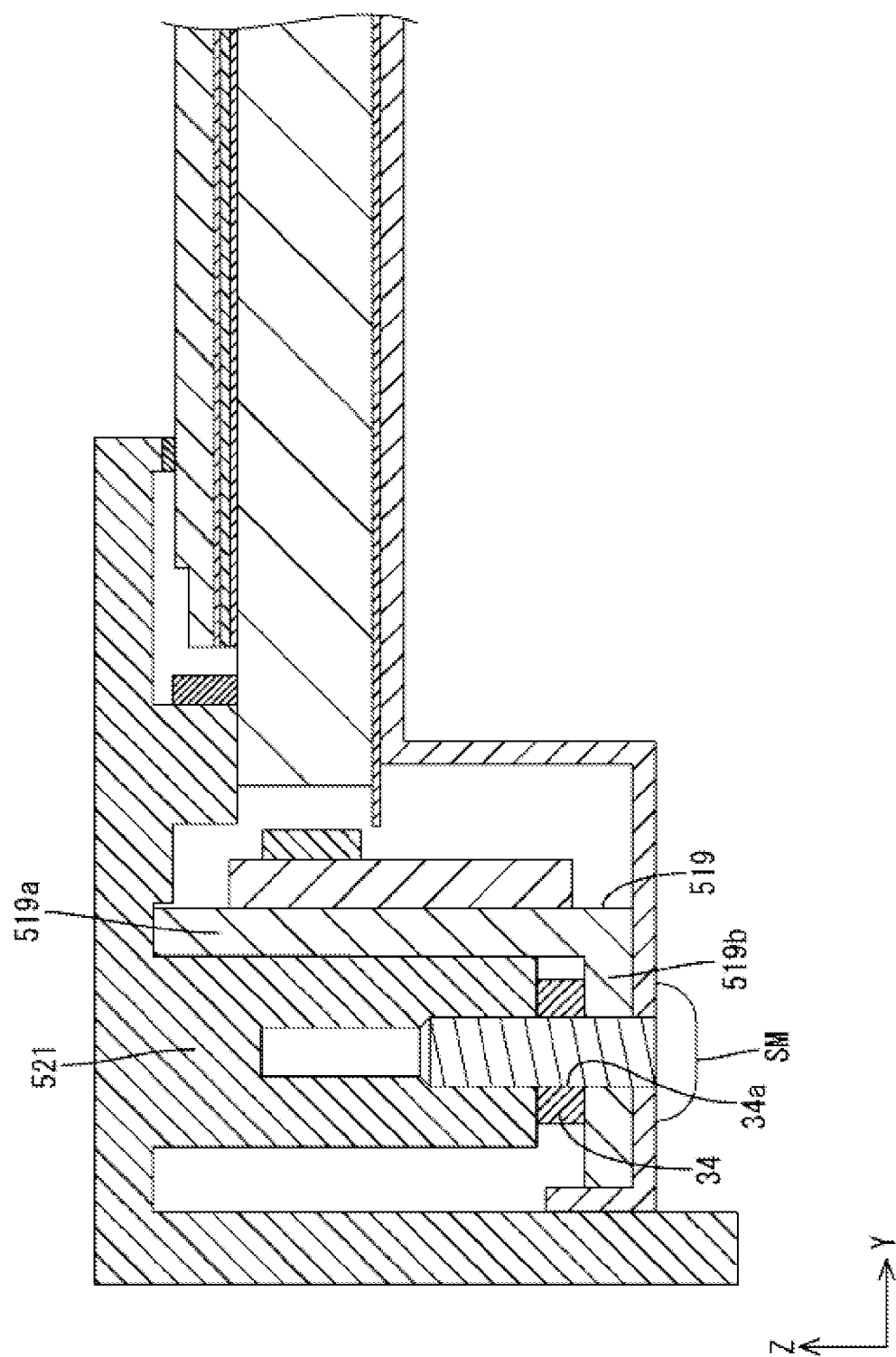
FIG. 20 is a cross-sectional view showing a cross-sectional configuration of a protruding member of Embodiment 6 of the present invention.

As shown in FIG. 20, the gap restricting member 34 of the present embodiment is a part separately provided from the protruding member 521 and the heat dissipating member 519, and is interposed between the protruding member 521 and the heat dissipating section 519b of the heat dissipating member 519, thereby restricting the gap therebetween. The gap restricting member 34 has an insertion hole 34a through which a screw SM is inserted, and is formed in a donut shape that surrounds a shaft of the screw SM. That is, the gap restricting member 34 is a washer. A plurality of gap restricting members 34 are arranged at intervals along the longer side direction (X axis direction) of the protruding member 521 and the heat dissipating member 519 so as to correspond to respective positions where screws SM are attached. With this configuration, in a manner similar to Embodiment 1 above, air spaces, which act as the heat insulating layers HIR, are formed between adjacent gap restricting members 34 (see FIG. 5). Even with such a configuration, the heat transfer to the protruding member 521 can be effectively prevented. The LED attachment section 519a of the heat dissipating member 519 makes surface-to-surface contact with the protruding member 521.

Other Embodiments

The present invention is not limited to the embodiments shown in the drawings and described above, and the following embodiments are also included in the technical scope of the present invention, for example.

(1) In Embodiments 1, 2, and 4, and respective modification examples of Embodiment 1, the gap restricting members interposed between the LED attachment section and the protruding member, and the gap restricting members interposed between the heat dissipating section and the protruding member had substantially the same arrangement pitch with respect to the X axis direction. It is, however, apparent that the arrangement pitch may differ between the two.

(2) In Embodiments 1, 2, and 4, and respective modification examples of Embodiment 1, the gap restricting members interposed between the LED attachment section and the protruding member, and the gap restricting members interposed between the heat dissipating section and the protruding member were arranged in corresponding positions to each other with respect to the X axis direction, but the present invention also includes a configuration in which the respective gap restricting members are offset from each other with respect to the X axis direction.

(3) In Embodiment 1 above, the gap restricting members that restrict the gap between the protruding member and the LED attachment section of the heat dissipating member were in a circular shape in a plan view, but the specific plan view shape may be changed appropriately. Examples of the plan view shape of the gap restricting member include an ellipse in a plan view, or a polygon such as triangle or quadrangle in a plan view.

(4) In Embodiment 1 above, the gap restricting members that restrict the gap between the protruding member and the heat dissipating section of the heat dissipating member were donut-shaped protrusions each formed along the hole edge of an insertion hole, but it is also possible to constitute the gap restricting member of a dot-shaped protrusion protruding from a portion of the hole edge of the insertion hole. In such a case, it is preferable to provide a plurality of gap restricting members along the hole edge of the insertion hole.

(5) In Modification Example 1 of Embodiment 1, the gap restricting member having a triangular cross section was shown as an example, but the specific cross-sectional shape of the gap restricting member may be changed appropriately. The cross-sectional shape of the gap restricting member may be a semicircular, ellipse, or pyramid shape in a cross-sectional view, for example, so as to make point contact or line contact with the protruding member or the heat dissipating member, or the cross-sectional shape may be a polygon such as a trapezoid in a cross-sectional view such that the gap restricting member makes surface-to-surface contact with the protruding member or the heat dissipating member.

(6) In Modification Example 2 of Embodiment 1 above, the LED attachment section and the heat dissipating section of the heat dissipating member were each provided with a pair of gap restricting members, but the present invention also includes a configuration in which the LED attachment section and the heat dissipating section are each provided with three or more gap restricting members. It is also possible to design the device such that the number of gap restricting members differs between the LED attachment section and the heat dissipating section.

(7) In addition to Embodiments 1, 2, and 4 to 6 and the respective modification examples of Embodiment 1, the specific number, arrangement, shape, and the like of the gap restricting members may be changed appropriately.

(8) In Embodiments 1, 2, and 4 and the respective modification examples of Embodiment 1, the gap restricting members were formed integrally with one of the protruding member and the heat dissipating member, and the gap restricting members abutted on the other, but it is also possible to form the gap restricting members integrally with both of the protruding member and the heat dissipating member, respectively, and have the respective gap restricting members abut on each other.

(9) In Embodiment 3 above, the heat insulating member was made of a foam resin material, but the present invention also includes a configuration in which the heat insulating member is made of a foam rubber material.

(10) In Embodiment 3 above, the heat insulating member extends along the longer side direction of the protruding member and the heat dissipating member and has a length that covers almost the entire length of the protruding member and the heat dissipating member, but the heat insulating member may also be divided into a plurality of parts along the longer side direction of the protruding member and the heat dissipating member. In such a case, both of the portions where the heat insulating member is disposed and the portions where the heat insulating member is not disposed may exist between the protruding member and the heat dissipating member.

(11) In Embodiment 3 above, the heat insulating members were provided between the protruding member and the LED attachment section of the heat dissipating member and between the protruding member and the heat dissipating section of the heat dissipating member, respectively, but the present invention also includes a configuration in which the heat insulating member is interposed between the protruding member and the LED attachment section of the heat dissipating member only, or the heat insulating member is interposed between the protruding member and the heat dissipating section of the heat dissipating member only.

(12) In Embodiment 4 above, the gap restricting members formed integrally with the protruding member abutted on the LED attachment section of the heat dissipating member, and the gap restricting member formed integrally with the heat dissipating section of the heat dissipating member abutted on the protruding member, but the present invention also includes a configuration in which gap restricting members formed integrally with the protruding member abuts on the heat dissipating section of the heat dissipating member, and gap restricting member formed integrally with the LED attachment section of the heat dissipating member abuts on the protruding member.

(13) In Embodiment 5 above, gap restricting members may be provided on one of the first protruding member and the LED attachment section of the heat dissipating member.

(14) In Embodiment 6 above, gap restricting members that were provided separately from the protruding member and the heat dissipating member were interposed only between the heat dissipating section of the heat dissipating member and the protruding member, but the gap restricting members may also be interposed between the LED attachment section of the heat dissipating member and the protruding member.

(15) In Embodiment 1 above, in the manufacturing process, the LED units were attached to the protruding members of the frame before the light guide plate is installed, but the LED units may also be attached to the frame after the light guide plate is installed.

(16) In the respective embodiments above, the protruding members were formed integrally with the frame, but the present invention also includes a configuration in which the protruding members are separate parts from the frame, and are attached to the frame. In such a case, the protruding members may be made of a metal as in the frame, or may be made of a synthetic resin that is a different material from that of the frame.

(17) In the respective embodiments above, the heat insulating layer was interposed between the protruding member and the heat dissipating member to which the LED substrate having LEDs thereon is attached, but the present invention also includes a configuration in which the heat dissipating member is omitted, the LED substrate is attached to the protruding member, and the heat insulating layer is interposed between the LED substrate and the protruding member. In such a case, the LED substrate needs to have the substantially L-shaped cross-section as in the heat dissipating member, and needs to be constituted of an LED mounting section in which the LEDs are mounted, and a heat dissipating section that makes surface-to-surface contact with the plate surface of the chassis.

(18) In the respective embodiments above, the heat dissipating section of the heat dissipating member protruded from the LED attachment section in the direction opposite from the light guide plate, but the present invention also includes a configuration in which the heat dissipating section protrudes from the LED attachment section toward the light guide plate.

(19) In the respective embodiments above, the chassis was the exterior member that constitutes the rear exterior of the liquid crystal display device, but the present invention also includes a configuration in which an additional exterior member is provided on the rear side of the chassis to cover the chassis, so that the chassis is not exposed to the outside.

(20) In the respective embodiments above, the frame and the chassis constituting the exterior member are both made of a metal, but the present invention also includes a configuration in which one or both of the frame and the chassis are made of a synthetic resin. It is preferable to employ this configuration in a mid- to small-sized model that does not require the liquid crystal display device to have very high mechanical strength.

(21) In the respective embodiments above, the chassis and the heat dissipating member were jointly fastened to the protruding member by the screw, but the present invention also includes a configuration in which a screw for affixing the chassis to the protruding member, and a screw for affixing the heat dissipating member to the protruding member are separately provided.

(22) The present invention also includes a configuration in which the screw for affixing the chassis to the protruding member is omitted from the configuration of (21) above, and a locking mechanism that engages the outer wall and the housing portion side wall of the chassis, for example, is provided.

(23) In the respective embodiments above, the screw was used to affix the chassis and the heat dissipating member to the protruding member, but a clip made of a synthetic resin, for example, may also be used, and the chassis and the heat dissipating member may be fastened by having the clip engage the protruding member.

(24) In the respective embodiments above, the power supply board was provided with the function of powering the LEDs, but the present invention also includes a configuration in which an LED driver board that powers the LEDs is separated from the power supply board.

(25) In the respective embodiments above, the main board was provided with a tuner part, but the present invention also includes a configuration in which a tuner board that has a tuner part is separated from the main board.

(26) In the respective embodiments above, the colored portions of the color filters provided in the liquid crystal panel included the three colors of R, G, and B, but it is possible to have the colored portions include four or more colors.

(27) In the respective embodiments above, LEDs were used as the light source, but other types of light source such as an organic EL may also be used.

(28) In the respective embodiments above, TFTs were used as switching elements for the liquid crystal display device, but the present invention can also be applied to a liquid crystal display device using other types of switching elements than TFTs (such as thin-film diodes (TFD), for example), and in addition to a color liquid crystal display device, the present invention can be applied to a liquid crystal display device that conducts black and white display.

(29) In the respective embodiments above, a liquid crystal display device using a liquid crystal panel as a display panel was described as an example, but the present invention can be applied to a display device that uses another type of display panel.

(30) In the respective embodiments above, a television receiver that includes a tuner part was illustratively shown, but the present invention is also applicable to a display device without a tuner.

(31) In the respective embodiments above, a pair of LED units (heat dissipating members, LED substrates) was disposed at respective longer side edges of the light guide plate so as to face each other, but the present invention also includes a configuration in which a pair of LED units is disposed at respective shorter side edges of the light guide plate so as to face each other, for example.

(32) In addition to (31) above, the present invention also includes a configuration in which two pairs of LED units (heat dissipating members, LED substrates) are disposed at respective longer and shorter side edges of the light guide plate so as to face each other, that is, four LED units are provided, or a configuration in which one LED unit is disposed at one longer side edge or one shorter side edge of the light guide plate. The present invention also includes a configuration in which three LED units are disposed at three side edges of the light guide plate so as to face each other.

(33) In the respective embodiments above, one LED unit (heat dissipating members, LED substrates) was provided at one side of the light guide plate, but it is also possible to provide a plurality of (two or more) LED units at one side of the light guide plate. In such a case, it is preferable that the plurality of LED units be arranged along the side of the light guide plate.

DESCRIPTION OF REFERENCE CHARACTERS

10 liquid crystal display device (display device)
11 liquid crystal panel (display panel)
11a display surface
13, 113, 213, 313, 413 frame (exterior member)
13a, 313a, 413a panel pressing portion
14, 414 chassis
16 light guide plate
17, 117, 217 LED (light source)
19, 119, 219, 319, 419, 519 heat dissipating member (light source attachment member)

19a, 119a, 219a, 319a, 419a, 519a LED attachment section (light source attachment part)
19b, 119b, 219b, 319b, 419b, 519b heat dissipating section
21, 121, 221, 321, 421, 521 protruding member
22 positioning portion
23 light-shielding portion (light-shielding portion, supporting portion)
26, 27, 126, 127, 326, 327, 427 gap restricting member
28, 29 heat insulating member
34 gap restricting member (gap restricting member)
SM screw (holding member)
TV television receiver

The invention claimed is:

1. A display device, comprising:
a light source;
a light source attachment member to which the light source is attached;
a display panel that conducts display using light from the light source;
a light guide plate placed on a side of the display panel opposite to a display surface thereof, the light guide plate being disposed such that an end face thereof faces the light source;
a chassis disposed on a side of the light guide plate opposite to the display panel;
an exterior member disposed on the display surface of the display panel, the exterior member holding the display panel and the light guide plate by sandwiching the display panel and the light guide plate with the chassis while housing the light source and the light source attachment member therein, the exterior member constituting a part of an exterior of the display device; and
a protruding member that protrudes from the exterior member toward the light source attachment member, the protruding member being in direct contact with the light source attachment member and attaching the light source attachment member to the exterior member,
wherein the protruding member and the light source attachment member are configured to provide for a heat insulator therebetween.

2. The display device according to claim 1,
wherein the light source attachment member has a heat dissipating section that extends along a surface of the chassis and that makes surface-to-surface contact with the surface of the chassis.

3. The display device according to claim 2,
wherein the heat dissipating section is disposed between the protruding member and the chassis, and
wherein the heat insulator is interposed between the heat dissipating section and the protruding member.

4. The display device according claim 1,
wherein the light source attachment member has a light source attachment section to which the light source is attached, the light source attachment section being disposed between the light guide plate and the protruding member, and
wherein the heat insulator is interposed between the light source attachment section and the protruding member.

5. The display device according to claim 4,
wherein the exterior member has a positioning portion that positions the light source attachment member with respect to the light guide plate by engaging an end of the light source attachment section.

6. The display device according claim 1,
wherein the exterior member has at least a panel pressing portion that lies in parallel with the display surface of the display panel and that presses the display panel, and
wherein the protruding member is configured to protrude from the panel pressing portion toward the chassis.

7. The display device according claim 1,
wherein the exterior member has a light-shielding portion in such a manner that the light-shielding portion is interposed between the display panel and the light source.

8. The display device according to claim 1,
wherein the exterior member has a panel pressing portion that lies in parallel with the display surface of the display panel and that presses the display panel, and
wherein the exterior member further has a supporting portion that protrudes from the panel pressing portion toward the chassis and that is in direct contact with and supports a surface of the light guide plate that faces the display panel from above.

9. The display device according claim 1, further comprising a holding member that is attached to the protruding member and that holds the light source attachment member and the chassis altogether by sandwiching the light source attachment member and the chassis with the protruding member.

10. The display device according claim 1, further comprising a gap restricting member disposed between the light source attachment member and the protruding member, the gap restricting member restricting a gap between the light source attachment member and the protruding member so as to form an air space that acts as the heat insulator therebetween.

11. The display device according to claim 10,
wherein a plurality of said gap restricting members are arranged at intervals.

12. The display device according claim 1, further comprising a heat insulating member interposed between the light source attachment member and the protruding member, the heat insulating member having said heat insulator.

13. The display device according to claim 1,
wherein the protruding member is integrally formed with the exterior member.

14. The display device according to claim 1,
wherein the exterior member is made of a metal.

15. A television receiver, comprising the display device according to claim 1.

16. The display device according to claim 1, wherein the heat insulator is an air space.

* * * * *